(12) United States Patent
Mau

(10) Patent No.: US 11,853,377 B2
(45) Date of Patent: Dec. 26, 2023

(54) IMAGE SEARCHING METHOD AND APPARATUS

(71) Applicant: SEE-OUT PTY LTD, Toowong (AU)

(72) Inventor: Sandra Mau, Toowong (AU)

(73) Assignee: SEE-OUT PTY LTD, Toowong (AU)

(*) Notice: Subject to any disclaimer, the term of this patent is extended or adjusted under 35 U.S.C. 154(b) by 604 days.

(21) Appl. No.: 14/916,720

(22) PCT Filed: Sep. 26, 2014

(86) PCT No.: PCT/AU2014/050251
§ 371 (c)(1),
(2) Date: Mar. 4, 2016

(87) PCT Pub. No.: WO2015/035477
PCT Pub. Date: Mar. 19, 2015

(65) Prior Publication Data
US 2016/0196350 A1 Jul. 7, 2016

(30) Foreign Application Priority Data

Sep. 11, 2013 (AU) ................................ 2013903476
Dec. 20, 2013 (AU) ................................ 2013905002

(51) Int. Cl.
*G06F 16/9538* (2019.01)
*G06F 16/951* (2019.01)
(Continued)

(52) U.S. Cl.
CPC ...... *G06F 16/9538* (2019.01); *G06F 16/2228* (2019.01); *G06F 16/248* (2019.01);
(Continued)

(58) Field of Classification Search
CPC ......... G06F 17/30864; G06F 17/30247; G06F 17/30256; G06F 17/30265;
(Continued)

(56) References Cited

U.S. PATENT DOCUMENTS 6,621,866 B1 * 9/2003 Florencio ............. H04N 19/467
375/240.25
6,898,333 B1 * 5/2005 Gopalakrishnan ... G06K 9/3275
358/1.5
(Continued)

FOREIGN PATENT DOCUMENTS

CA        2734613 A1    2/2010
WO   WO-2004/057493 A2   7/2004

OTHER PUBLICATIONS

Homola, "Techniques for Content-Based Sub-Image Retrieval", Masaryk University (Year: 2013).*
(Continued)

*Primary Examiner* — Irete F Ehichioya
*Assistant Examiner* — Huen Wong
(74) *Attorney, Agent, or Firm* — Weaver IP L.L.C.

(57) ABSTRACT

Apparatus for performing searching of a plurality of reference images, the apparatus including one or more electronic processing devices that search the plurality of reference images to identify first reference images similar to a sample image, identify image tags associated with at least one of the first reference image, search the plurality of reference images to identify second reference images using at least one of the image tags and provide search results including at least some first and second reference images.

28 Claims, 18 Drawing Sheets

(51) Int. Cl.

| | |
|---|---|
| *G06F 16/51* | (2019.01) |
| *G06F 16/248* | (2019.01) |
| *G06F 16/22* | (2019.01) |
| *G06F 16/2457* | (2019.01) |
| *G06T 7/90* | (2017.01) |
| *G06T 7/11* | (2017.01) |
| *G06F 16/583* | (2019.01) |
| *G06F 16/58* | (2019.01) |
| *G06F 18/10* | (2023.01) |
| *G06F 18/21* | (2023.01) |
| *G06T 3/40* | (2006.01) |
| *G06T 5/00* | (2006.01) |
| *G06V 30/10* | (2022.01) |

(52) U.S. Cl.
CPC ........ *G06F 16/24578* (2019.01); *G06F 16/51* (2019.01); *G06F 16/58* (2019.01); *G06F 16/583* (2019.01); *G06F 16/5838* (2019.01); *G06F 16/5846* (2019.01); *G06F 16/5854* (2019.01); *G06F 16/951* (2019.01); *G06F 18/10* (2023.01); *G06F 18/2178* (2023.01); *G06T 3/40* (2013.01); *G06T 5/002* (2013.01); *G06T 7/11* (2017.01); *G06T 7/90* (2017.01); *G06V 30/10* (2022.01); *G06V 2201/09* (2022.01); *G06V 2201/10* (2022.01)

(58) Field of Classification Search
CPC ........... G06F 17/30554; G06F 16/5838; G06F 16/58383; G06F 16/24578; G06F 16/248; G06F 16/58; G06F 16/951; G06F 16/5854; G06K 9/342; G06K 9/4671; G06K 9/6298
See application file for complete search history.

(56) References Cited

U.S. PATENT DOCUMENTS

| | | | | |
|---|---|---|---|---|
| 7,184,100 | B1* | 2/2007 | Wilf | G11B 27/28 348/700 |
| 7,593,602 | B2 | 9/2009 | Stentiford | |
| 7,925,044 | B2* | 4/2011 | Metois | G06V 10/40 382/240 |
| 8,180,667 | B1* | 5/2012 | Baluja | H04N 21/2743 705/14.19 |
| 8,320,665 | B2* | 11/2012 | Puneet | G06V 10/56 382/164 |
| 8,429,173 | B1 | 4/2013 | Rosenberg et al. | |
| 8,457,443 | B2* | 6/2013 | Kuo | H04N 5/44504 382/294 |
| 8,489,627 | B1* | 7/2013 | Brandt | G06F 17/30277 707/765 |
| 8,676,803 | B1* | 3/2014 | Leung | G06F 16/5866 707/737 |
| 8,744,196 | B2* | 6/2014 | Sharma et al. | G06Q 10/0875 |
| 9,773,023 | B2* | 9/2017 | Iorio | G06F 16/5866 |
| 10,936,911 | B2* | 3/2021 | Attorre | G06V 10/751 |
| 2002/0168090 | A1* | 11/2002 | Bruce | G06K 9/033 382/101 |
| 2002/0181772 | A1* | 12/2002 | Ihara | G06K 19/06037 382/181 |
| 2003/0091237 | A1* | 5/2003 | Cohen-Solal | G06K 9/3266 382/204 |
| 2003/0108237 | A1* | 6/2003 | Hirata | G06K 9/4652 382/164 |
| 2006/0050993 | A1 | 3/2006 | Stentiford | |
| 2006/0251338 | A1* | 11/2006 | Gokturk | G06F 16/583 382/305 |
| 2007/0019853 | A1* | 1/2007 | Luo | G06K 9/38 382/132 |
| 2007/0122037 | A1* | 5/2007 | Shiiyama | G06K 9/2063 382/190 |
| 2007/0133947 | A1* | 6/2007 | Armitage | G06F 16/58 386/230 |
| 2008/0215548 | A1* | 9/2008 | Ohashi | G06K 9/00664 |
| 2009/0132462 | A1 | 5/2009 | Szabo | |
| 2009/0157661 | A1 | 6/2009 | Carullo et al. | |
| 2009/0196512 | A1* | 8/2009 | Shelton | G06K 9/346 382/229 |
| 2010/0046842 | A1 | 2/2010 | Conwell | |
| 2010/0195914 | A1* | 8/2010 | Isard | G06K 9/4676 382/201 |
| 2010/0260426 | A1* | 10/2010 | Huang | G06F 18/217 707/E17.031 |
| 2010/0332210 | A1* | 12/2010 | Birdwell | G06F 16/2228 703/22 |
| 2010/0332475 | A1* | 12/2010 | Birdwell | G06F 16/283 707/737 |
| 2011/0125735 | A1* | 5/2011 | Petrou | G06F 16/5838 707/723 |
| 2011/0176737 | A1 | 7/2011 | Mass et al. | |
| 2011/0212717 | A1 | 9/2011 | Rhoads et al. | |
| 2011/0216937 | A1* | 9/2011 | Radhakrishnan | G06V 10/462 382/100 |
| 2012/0254790 | A1 | 10/2012 | Colombino et al. | |
| 2013/0124951 | A1* | 5/2013 | Shechtman | G06K 9/00718 715/201 |
| 2014/0149376 | A1* | 5/2014 | Kutaragi | G06F 16/532 707/706 |
| 2015/0161172 | A1* | 6/2015 | Bengio | G06K 9/6223 707/749 |
| 2016/0012594 | A1* | 1/2016 | Romanik | G06V 10/44 382/203 |
| 2016/0042252 | A1* | 2/2016 | Sawhney | G06F 16/55 382/190 |
| 2016/0224593 | A1* | 8/2016 | Qiu | G06F 16/9024 |
| 2018/0330198 | A1* | 11/2018 | Harary | G06V 20/36 |
| 2019/0108396 | A1* | 4/2019 | Dal Mutto | G07G 1/0063 |
| 2020/0090007 | A1* | 3/2020 | Joseph | G06K 9/6223 |
| 2020/0134377 | A1* | 4/2020 | Attorre | G06V 10/82 |

OTHER PUBLICATIONS

Eakins et al., "Similarity Retrieval of Trademark Images", IEEE Xplore (Year: 1998).*
Trappey et al., "Intelligent trademark recognition and similarity analysis using a two-stage transfer learning approach" (Year: 2022).*
Phan, "Content-based retrieval of logo and trademarks in unconstrained color image databases using Color Edge Gradient Co-occurrence Histograms", Ryerson University (Year: 2009).*
Bhunia, "Query-based Logo Segmentation", Nanyang Technological University (Year: 2018).*
Markos Markou et al. "Neural Network Analysis of MINERVA Scene Analysis Benchmark", Image Analysis and Processing, 2001. Proceedings. 11th International Conference on Sep. 26-28, 2001, Piscataway, NJ, USA, IEEE, Sep. 26, 2001 (Sep. 26, 2001), pp. 267-272).
Wei-Ying Ma et al, "NeTra: a toolbox for navigating large image databases", Multimedia Systems, Dec. 31, 1999, vol. 7, No. 3, pp. 184-198.
Extended European Search Report completed on Jan. 12, 2017.
Written Opinion issued by Singaporean Patent Office dated Apr. 10, 2017.
International Search Report and Written Opinion of the ISA for PCT/AU2014/050251, ISA/AU, Woden ACT, dated Dec. 18, 2014.

* cited by examiner

IMAGE SEARCHING METHOD AND APPARATUS

CROSS-REFERENCE TO RELATED APPLICATIONS

This application is a 371 U.S. National Stage of International Application No. PCT/AU2014/050251, filed Sep. 26, 2014. This application claims the benefit of and priority to Australian Patent Applications Nos. 2013903476, filed Sep. 11, 2013 and 2013905002, filed Dec. 20, 2013. The entire disclosures of the above applications are incorporated herein by reference.

BACKGROUND OF THE INVENTION

This invention relates to an image searching method and apparatus and in particular to a method and apparatus for searching a plurality of reference images such as trademarks, logos or the like.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

For a company, its brand, which often takes the form of a trademark of its name and logo, is often its most important asset. Countries around the world have Intellectual Property (IP) offices that provide a formal mechanism for companies to protect its brand via trademarks registration. This registration system enables a brand to object to or enforce against other logos or trademarks that may be similar and cause commercial confusion, thus allow them to build a unique public identity to establish their business upon.

Additionally, the Madrid Protocol and Agreement, created in 1996 and to which around 90 countries have signed on to, provides for the international registration of trademarks by way of one application that can cover more than one country. The opportunity of having a single registration to cover a wide range of countries gives advantages, both in terms of portfolio management and cost savings, as opposed to a portfolio of independent national registrations.

However, a trademark application may be rejected if there exists another already established trademark (whether registered or common law, i.e. not registered but with an established offering in the market) which is substantial similar and likely to cause brand confusion. This can be a big waste of time and money, thus, prior to the application to register a trademark, it is recommend a search be conducted against the trademark databases of the national offices to which the application is being made, as well as a common law search.

Unfortunately, searching for a trademark device (or logo or image) can be very hard to do as current it has to be done via text descriptions of the image. For trademark offices, many of the countries have adopted standard list of text-based descriptors, also known as image constituent particulars (e.g., square, square+, rectangle, diamond, and thousands more), for trademark devices. This includes a number of different conventions around the world such as the Vienna and USPTO Classifications which categorizes image constituents into numbered main and sub categories (e.g., 1.1.1-'Stars', 1.1.15-'Comets, stars with tail', etc), and Australia which uses text-based image constituent particulars, but ultimately at the base level, all are text-based descriptions of the image and components within (constituents).

Unfortunately, searching for a trademark device (or logo or image) can be very cumbersome and time consuming to do as currently it has to be done via text descriptions against the text metadata of the image. For common or abstract logos, for example a Nike "swoosh" or an Adidas "flower", finding the most suitable text descriptors can be very challenging. There are so many to choose from that there are often tens of thousands of matches to look through. Additionally, if certain descriptors are missed (i.e. if the searcher describes the same image differently to what the IP office index it as), one is likely to miss similar matching devices. The common law search on the Internet is not any easier either. For the most part, the search does have to be done via text description as well.

SUMMARY OF THE PRESENT INVENTION

In one broad form the present invention provides apparatus for performing searching of a plurality of reference images, the apparatus including one or more electronic processing devices that:
  a) search the plurality of reference images to identify first reference images similar to a sample image;
  b) identify image tags associated with at least one of the first reference image;
  c) search the plurality of reference images to identify second reference images using at least one of the image tags; and,
  d) provide search results including at least some first and second reference images.

Typically the one or more electronic devices:
  a) determine a first image ranking in accordance with a similarity of the first reference images with the sample image; and,
  b) select the at least one first reference image at least partially in accordance with the first image ranking.

Typically the one or more electronic devices:
  a) present at least some first reference images to a user,
  b) determine at least one selected first reference image in accordance with user input commands; and,
  c) identify image tags associated with the at least one selected first image.

Typically the one or more electronic devices present first reference images to the user in accordance with a first image ranking.

Typically the one or more electronic devices:
  a) determine an image tag ranking in accordance with a frequency of occurrence;
  b) select the at least one image tag at least partially in accordance with the image tag ranking.

Typically the one or more electronic devices:
  a) present a plurality of image tags associated with the at least one first reference image to the user;
  b) determine at least one selected image tag in accordance with user input commands; and,
  c) search the plurality of reference images using the at least one selected image tag.

Typically the one or more electronic devices present image tags in accordance with an image tag ranking.

Typically the image tags include metadata tags.

Typically the one or more electronic devices:
 a) determine a results ranking of the first and second reference images; and,
 b) provide the search results in accordance with the results ranking.

Typically the one or more electronic devices determine the results ranking in accordance with at least one of:
 a) a first image ranking;
 b) a second image ranking; and,
 c) combined first and second image rankings.

Typically the one or more electronic devices determine a second image ranking in accordance with a similarity of the second reference images with the image tags.

Typically the one or more electronic devices receive the sample image from the user.

Typically the one or more electronic devices process the sample image.

Typically the one or more electronic devices process the sample image by:
 a) segmenting the sample image to form sample sub-images; and,
 b) search the plurality of reference images using the sample image and sample sub-images.

Typically the one or more electronic devices segment the sample image by:
 a) determining clusters of image features; and,
 b) segmenting the image in accordance with clusters.

Typically the one or more electronic devices segment the sample image by:
 a) converting the sample image to a greyscale image;
 b) filtering the greyscale image to generate a filtered greyscale image;
 c) normalising an image intensity of the filtered greyscale image to generate a normalised image; and,
 d) determining clusters within the normalised image.

Typically the one or more electronic devices process the sample image by at least one of:
 a) scaling the sample image and the sample sub-images;
 b) determining image features from the sample image and sample sub-images; and,
 c) remove at least one of:
  i) an image background;
  ii) noise; and,
  iii) text.

Typically the one or more electronic processing devices scale the sample image and sample sub-images by:
 a) cropping the images and sub-images to remove background and form cropped images; and,
 b) resizing the cropped image to a defined image size.

Typically the one or more electronic processing devices process the sample image by:
 a) performing optical character recognition to detect text; and,
 b) removing text from the image.

Typically the one or more electronic processing devices:
 a) process at least one of the sample image and sample sub-images to determine sample image features; and,
 b) use the sample image features to determine a sample feature vector.

In another broad form the present invention provides a method for performing searching of a plurality of reference images, the method including:
 a) searching the plurality of reference images to identify first reference images similar to a sample image;
 b) identifying image tags associated with at least one of the first reference image;
 c) searching the plurality of reference images to identify second reference images using at least one of the image tags; and,
 d) providing search results including at least some first and second reference images.

In another broad form the present invention provides apparatus for use in searching of a plurality of reference images, the apparatus including one or more electronic processing devices that:
 a) acquire at least one image;
 b) process the image to determine a number of sub-images and image features associated with the image and/or sub-image; and,
 c) use the image, the sub-image and image features to perform image searching, wherein the image is at least one of a sample image and one of a plurality of reference images, and wherein searching is performed by at least in part by searching a plurality of reference images to identify reference images similar to the sample image.

Typically the method includes creating an index including a plurality of reference images, each reference image being associated with a number of sub-images and image features.

Typically the one or more electronic devices process the sample image by segmenting the image to form the sub-images.

Typically the one or more electronic devices segment the image by:
 a) determining feature clusters in the image; and,
 b) segmenting the image in accordance with the clusters.

Typically the one or more electronic devices segment the image by:
 a) converting the image to a greyscale image;
 b) filtering the greyscale image to generate a filtered greyscale image;
 c) normalising an image intensity of the filtered greyscale image to generate a normalised image; and,
 d) determining clusters within the normalised image.

Typically the one or more electronic devices process the image by at least one of:
 a) scaling the image and the sub-images;
 b) determining image features from the image and sub-images; and,
 c) remove at least one of:
  i) an image background;
  ii) noise; and,
  iii) text.

Typically the one or more electronic processing devices scale the images by:
 a) cropping the images and sub-images to remove background and form cropped images; and,
 b) resizing the cropped image to a defined image size.

Typically the one or more electronic processing devices process the image by:
 a) performing optical character recognition to detect text, and,
 b) removing text from the image.

Typically when the image is a reference image, the one or more electronic processing devices associate the text with the reference image in an index.

Typically the one or more electronic processing devices:
 a) process at least one of the image and sub-images to determine image features; and,
 b) use the image features to determine a feature vector.

In another broad form the present invention provides a method for use in searching of a plurality of reference images, the method including:
  a) acquiring at least one image;
  b) processing the image to determine a number of sub-images and image features associated with the image; and,
  c) using the image, the sub-image and image features to perform image searching, wherein the image is at least one of a sample image and one of a plurality of reference images, and wherein searching is performed by at least in part by searching a plurality of reference images to identify reference images similar to the sample image.

In another broad form the present invention seeks to provide a method for performing an image search, the method including the steps of:
  a) User uploads query image to a search engine;
  b) Search engine uses image recognition to identify visually similar matching images in a database;
  c) User presented with matching image results;
  d) User selects all or some of those matching image results as most relevant;
  e) Search system pulls metadata of selected results to collate and rank the most relevant image tags;
  f) User presented with list of image tags; and,
  g) User presented with option to conduct combined image and text search based on one or more of the image tags.

In another broad form the present invention seeks to provide a search system for performing an image search, the search system including a search engine and wherein:
  a) User uploads query image to a search engine;
  b) Search engine uses image recognition to identify visually similar matching images in a database;
  c) User presented with matching image results;
  d) User selects all or some of those matching image results as most relevant;
  e) Search system pulls metadata of selected results to collate and rank the most relevant image tags;
  f) User presented with list of image tags; and,
  g) User presented with option to conduct combined image and text search based on one or more of the image tags.

In another broad form the present invention seeks to provide a method for pre-processing of images from a trademark database, the method including:
  a) segmentation of sub-images within the image;
  b) scaling the image and sub-images to a pre-determined size;
  c) performing feature extraction on each resulting image and sub-image so that patterns in the image and sub-images are summarized as features; and,
  d) indexing the images, sub-images, and features in a database for searching.

In another broad form the present invention seeks to provide apparatus for pre-processing of images from a trademark database, the apparatus including a computer system that performs:
  a) segmentation of sub-images within the image;
  b) scaling the image and sub-images to a pre-determined size;
  c) performing feature extraction on each resulting image and sub-image so that patterns in the image and sub-images are summarized as features; and,
  d) indexing the images, sub-images, and features in a database for searching.

BRIEF DESCRIPTION OF THE DRAWINGS

An example of the present invention will now be described with reference to the accompanying drawings, in which:—

DETAILED DESCRIPTION OF THE PREFERRED EMBODIMENTS

Figure 1A:
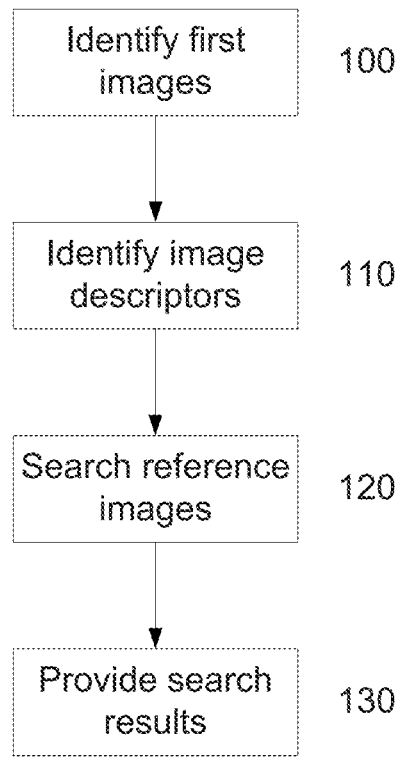
FIG. 1A is a flow chart of an example of a method for performing searching of a plurality of reference images.

An example of a method for performing searching of a plurality of reference images will now be described in more detail with reference to the FIG. 1A.

In this example, it is assumed that the process is performed at least in part using one or more electronic processing devices forming part of one or more processing systems, which are in turn connected to one or more other computer systems via a network architecture, as will be described in more detail below.

For the purpose of the example, the following terminology will be used. The term "user" is used to refer to an entity such as an individual, company, or the like, that is interacting with the processing system, for example to perform searching. The term "reference image" refers to stored images against which the search is being performed. In one example, the reference images are trademarks or logos, but could also include other brand image assets that may or may not have been registered, such as icons, cartoon characters, or the like. It will also be appreciated that this is not essential. The term "sample image" refers to an example image that is submitted as part of a query for searching the reference images.

The term "image tag" is used to refer to information that describes objects or semantic information in the image. In the case of trademarks, image tags are sometimes referred to as image descriptors, dictionary terms, design search codes, Vienna classification terms or codes, or the like. Image tags are often, though not exclusively, defined manually and may be stored as meta-data associated with the image, allowing this to be subsequently searched.

In this example, at step 100 the one or more electronic processing devices search the plurality of reference images to identify first reference images similar to a sample image. This can be performed in one of a variety of ways but typically involves analyzing the sample image using image recognition techniques to identify characteristics of the image, and then utilizing the results of this analysis to perform a search of the plurality of reference images. In one particular example, this involves analyzing the sample image to determine one or more feature vectors indicative of features within the image, which is then compared to feature vectors of the reference images.

At step 110 the one or more electronic processing devices identify image tags associated with at least one of the first reference images. The image tags are typically stored associated with the first reference images, for example in the form of metadata, or the like and in one example are in the form of text descriptors indicative of the image content.

This can be performed for each of the first reference images, but more typically is performed for a subset of the first reference images that are visually most similar to the sample image. This can be determined in one of many numbers of ways and can involve displaying first reference images to a user, allowing the user to view these and select first reference images of interest. Alternatively, the first reference images could be ranked based on their similarity to the sample image with the highest ranked first reference images being automatically selected.

At step 120 the one or more electronic processing devices search the plurality of reference images to identify the second reference images using at least one of the image tags. Thus, the image tags determined at step 110 can be compared to image tags associated with each of the reference images, allowing the second reference images to be identified.

At step 130 search results are provided typically by displaying these to a user, with the search results including at least some first and second reference images, although alternatively the search results could be delivered using any suitable technique.

Accordingly, the above described process operates by initially performing a search utilizing image recognition technologies to automatically identify first reference images that are broadly similar to a sample image. Image tags associated with at least some of these first reference images are then utilized to perform additional searching. This can be used to return a list of search results based on both the image recognition and image tag searching.

This therefore uses two independent searching processes to be performed in order to maximize the chance of identified relevant images of interest. This is particularly important when searching databases such as trademark databases, where images are typically identified on the basis of image tags. The image tags may be unfamiliar to people utilizing the database, making it difficult for individuals to search trademarks databases without proper training. Additionally, the image tags are typically created manually when trademarks are initially stored in a database, and this can be performed inconsistently depending on the person creating the descriptor, changes in usage of the descriptors over time, or the like. This means different images descriptors can be used to describe similar images, whist similar image tags can be used to describe different images, making the searching process harder.

Nevertheless, the use of image tags is still typically a more powerful search process than the use of image recognition alone. Accordingly, the above described process utilizes image recognition as a coarse filter in order to identify first reference images of interest which are then utilized to display image tags. Even for users unfamiliar with image tags, they are able to review these and identify image tags that will potentially be relevant to the sample image, allowing further reference images to be identified in a more refined searching process.

Figure 1B:
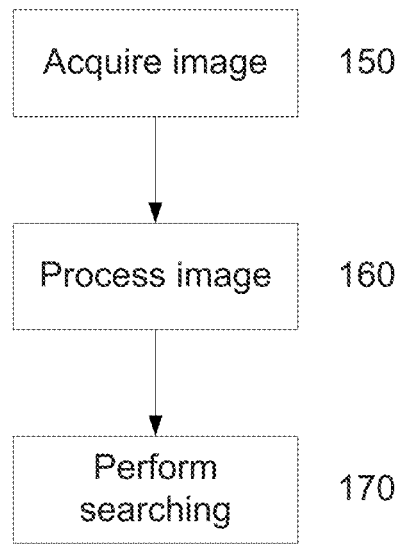
FIG. 1B is a flow chart of an example of a method for processing an image for use in searching a plurality of reference images.

In order for the above described process to operate as effectively as possible it is preferable to perform pre-processing of images to ensure consistency of the format and content of the sample and reference images. This can in turn be used to maximise the effectiveness and speed of the image recognition process and hence searching process, and an example of the image processing techniques will be described with reference to FIG. 1B.

In this example, at step 150 an image is acquired. The image could be either a sample image for which searching is to be performed or alternatively could include one of a plurality of reference images.

At step 160 the image is processed to determine a number of sub images and image features associated with the image at step 170, the image, sub-image and image features are used to perform image searching, which can be performed for example utilizing the above described technique.

Accordingly, processing is performed in order to identify particular image features across images and sub-images. The nature of the sub-images and image features will vary depending upon preferred implementation. In one example, the sub-images correspond to particular components of the image such as text, logos, logo parts or the like. Similarly the image features could include the location, shape, colour, intensity or the like of particular components of the image. By identifying these as separate sub-images, this allows sample image components to be compared directly to components of reference images, thereby increasing the likelihood of a similar image being accurately identified.

A number of further features will now be described.

Typically the one or more electronic devices determine a first image ranking in accordance with a similarity of the first reference images with the sample image and select the at least one first reference image at least partially in accordance with the first image ranking. Additionally, and/or alternatively the one or more electronic devices present at least some first reference images to a user, determine at least one selected first reference image in accordance with user input commands and identify image tags associated with the at least one selected first image. As part of this, the one or more electronic devices can present first reference images to the user in accordance with a first image ranking. Accordingly, these processes allow first images that are most similar to the sample image to be selected as a basis for further searching, thereby enhancing the effectiveness of the further searching.

The one or more electronic devices can determine an image tag ranking in accordance with a frequency of occurrence and select the at least one image tag at least partially in accordance with the image tag ranking. The frequency of occurrence could be a frequency of occurrence within one or more of the first reference images. In this regard, similar image tags may be used in multiple ones of the first reference images, in which case these are more likely to be relevant and hence are presented to the user in preference to other image tags. Additionally, and/or alternatively a ranking can be based on the frequency of occurrence of an image tag within the plurality of reference images as a whole, and not just those identified as first reference images. For example, the descriptor HAND might be more distinctive than the descriptor CIRCLE if there are fewer reference images having a HAND as opposed CIRCLE descriptor. In one example, a combination of the two frequencies can be used, such as a TF-IDF (term frequency-inverse document frequency) combination.

The one or more electronic devices can also present a plurality of image tags associated with the at least one first reference image to the user, determine at least one selected image tag in accordance with user input commands and search the plurality of reference images using the at least one selected image tag. As part of this, the one or more electronic devices can present image tags in accordance with an image tag ranking. Accordingly, this allows the user to select the image tags that the user believes most accurately describe the sample image, hence enhancing the effectiveness of the further searching.

The image tags can be of any suitable form, but in one example include metadata tags.

The one or more electronic devices can determine a results ranking of the first and second reference images and provide the search results in accordance with the results ranking. This can include determining the results ranking in accordance with a first image ranking, a second image ranking or a combined first and second image ranking, with the second image ranking being determined in accordance with a similarity of the second reference images with the image tags. Thus, either or both of the first and second reference images can be ranked so that more relevant reference images identified via either search technique can be displayed to the user in preference to less relevant reference images.

The one or more electronic devices typically receive the sample image from the user, although alternatively this could be retrieved from a database, or the like.

The one or more electronic devices typically process the sample image to make it easier to compare the sample image to the reference images. Similarly, when initially receiving reference images, the one or more electronic processing devices typically process the reference images and then create an index including a plurality of reference images, each reference image being associated with a number of sub-images, image features and optionally image tags.

When processing images, the one or more electronic devices segment the image to form the sub-images. This is typically performed by determining feature clusters in the image and segmenting the image in accordance with the clusters. In particular, this can involve converting the image to a greyscale image, filtering the greyscale image to generate a filtered greyscale image, normalising an image intensity of the filtered greyscale image to generate a normalised image and determining clusters within the normalised image. This allows individual components of the image to be processed separately, for example, allowing text to be processed differently to images, thereby making the searching process more effective.

The one or more electronic devices typically process the image by scaling the image and the sub-images, determining image features from the image and sub-images and remove an image background, noise or text. Scaling is typically performed by cropping the images and sub-images to remove background and form cropped images and resizing the cropped image to a defined image size so that all of the reference, sample and corresponding sub images are of a similar size, again making comparison of the images more effective.

The one or more electronic processing devices can also process the image by performing optical character recognition to detect text and remove text from the image. This can also then be compared to image tags, such as metadata, which typically include an indication of any text within the image, either to ensure accuracy in the character recognition process and/or for the purpose of searching image tags. When the image is a reference image, the one or more electronic processing devices also typically associate the text with the reference image in an index.

Furthermore, the one or more processing device typically process at least one of the image and sub-images to determine image features and use the image features to determine a feature vector. This allows the sample and reference images to be compared by comparing the feature vectors, allowing for more accurate matching to be performed.

Figure 2:
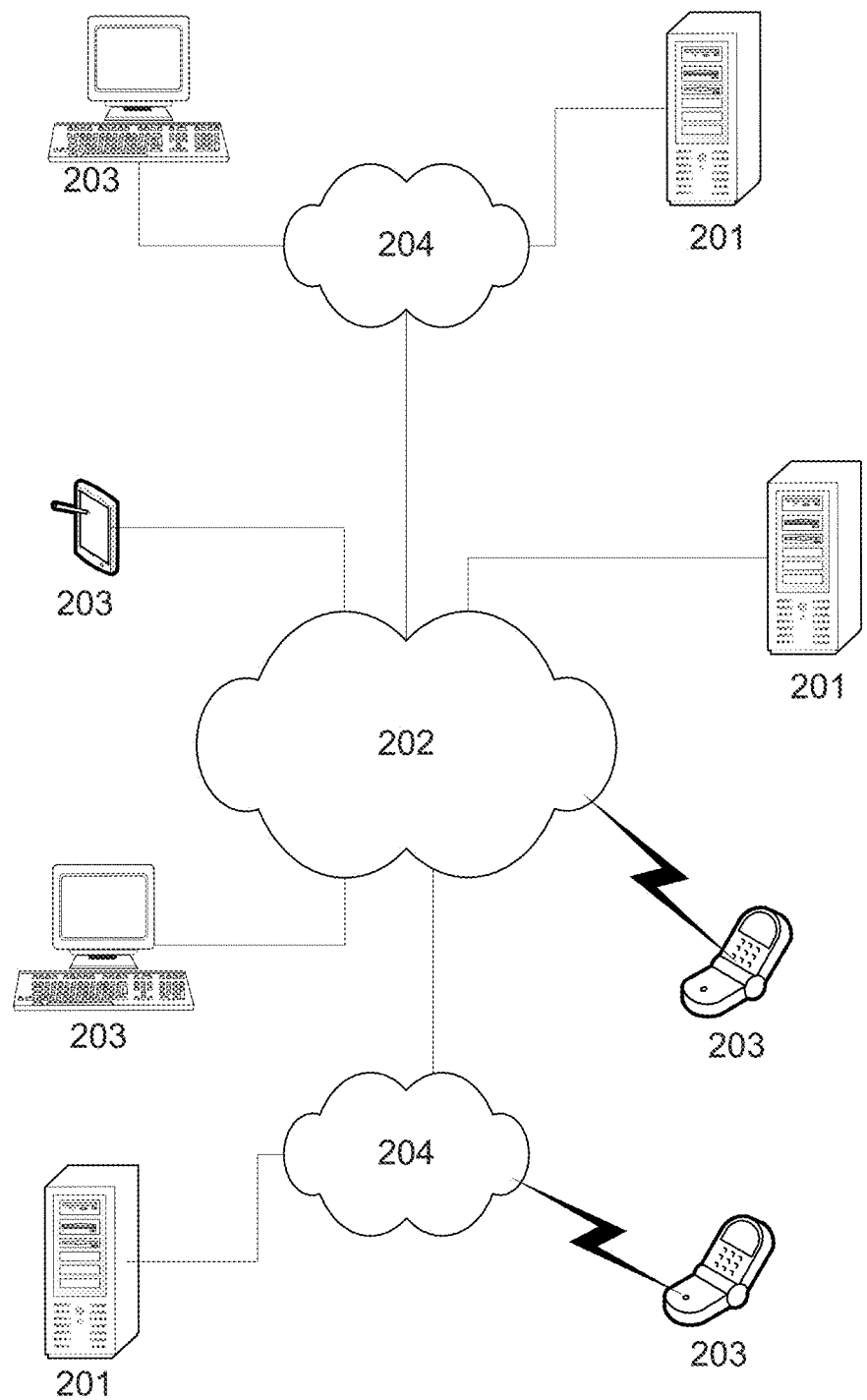
FIG. 2 is a schematic diagram of an example of a distributed computer architecture.

In one example, the process is performed by one or more processing systems operating as part of a distributed architecture, an example of which will now be described with reference to FIG. 2.

In this example, a base station 201 is coupled via a communications network, such as the Internet 202, and/or a number of local area networks (LANs) 204, to a number of computer systems 203. It will be appreciated that the configuration of the networks 202, 204 are for the purpose of example only, and in practice the base station 201 and computer systems 203 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

In one example, the base station 201 includes one or more processing systems 210 coupled to one or more databases 211. The base station 201 is adapted to be used in performing searching, as well as processing images, for example to create an index of reference images. The base station could also be used for performing ancillary processes such as to administer billing and other related operations. The computer systems 203 are therefore adapted to communicate with the base station 201, allowing sample images to be submitted, to review search results, and to control the search process, for example by selecting relevant first reference images and image tags.

Whilst the base station 201 is a shown as a single entity, it will be appreciated that the base station 201 can be distributed over a number of geographically separate locations, for example by using processing systems 210 and/or databases 211 that are provided as part of a cloud based environment. However, the above described arrangement is not essential and other suitable configurations could be used.

Figure 3:
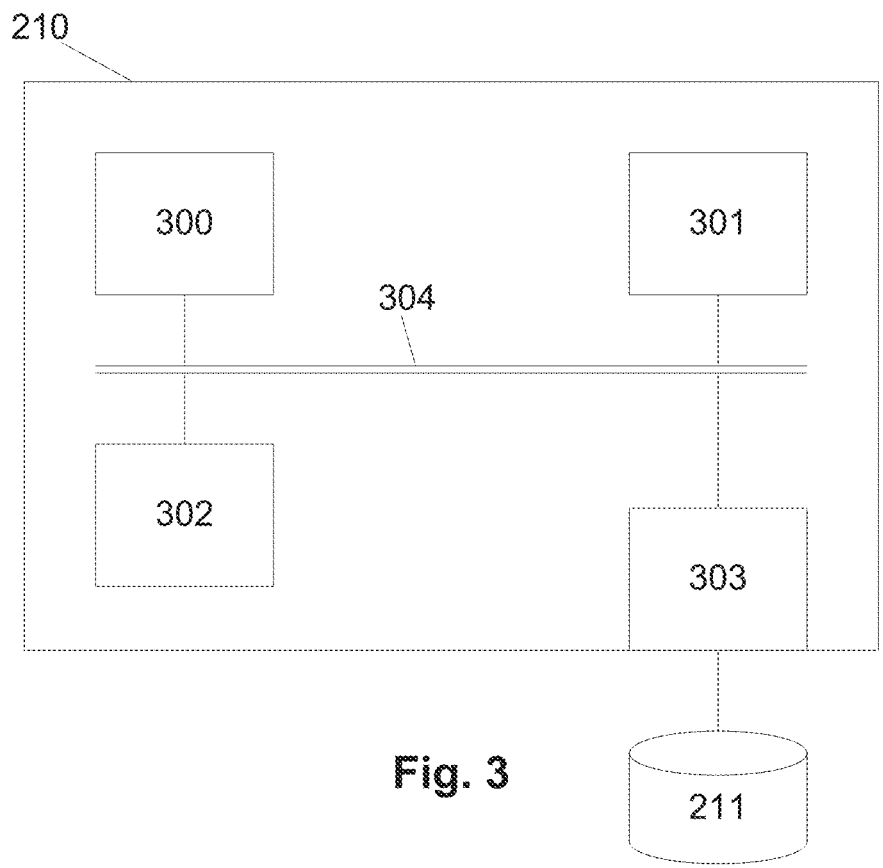
FIG. 3 is a schematic diagram of an example of a processing system of FIG. 2.

An example of a suitable processing system 210 is shown in FIG. 3. In this example, the processing system 210 includes at least one microprocessor 300, a memory 301, an optional input/output device 302, and an external interface 303, interconnected via a bus 304 as shown. In this example the external interface 303 can be utilised for connecting the processing system 210 to peripheral devices, such as the communications networks 202, 204, databases 211, other storage devices, or the like. Although a single external interface 303 is shown, this is for the purpose of example only, and in practice multiple interfaces using various methods (eg. Ethernet, serial, USB, wireless or the like) may be provided.

In use, the microprocessor 300 executes instructions in the form of applications software stored in the memory 301 to allow the searching and related processes to be performed, as well as to communicate with the computer systems 203. The applications software may include one or more software modules, and may be executed in a suitable execution environment, such as an operating system environment, or the like.

Accordingly, it will be appreciated that the processing system 210 may be formed from any suitable processing system, such as a suitably programmed computer system, PC, web server, network server, or the like. In one particular example, the processing system 210 is a standard processing system such as a 32-bit or 64-bit Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 4:
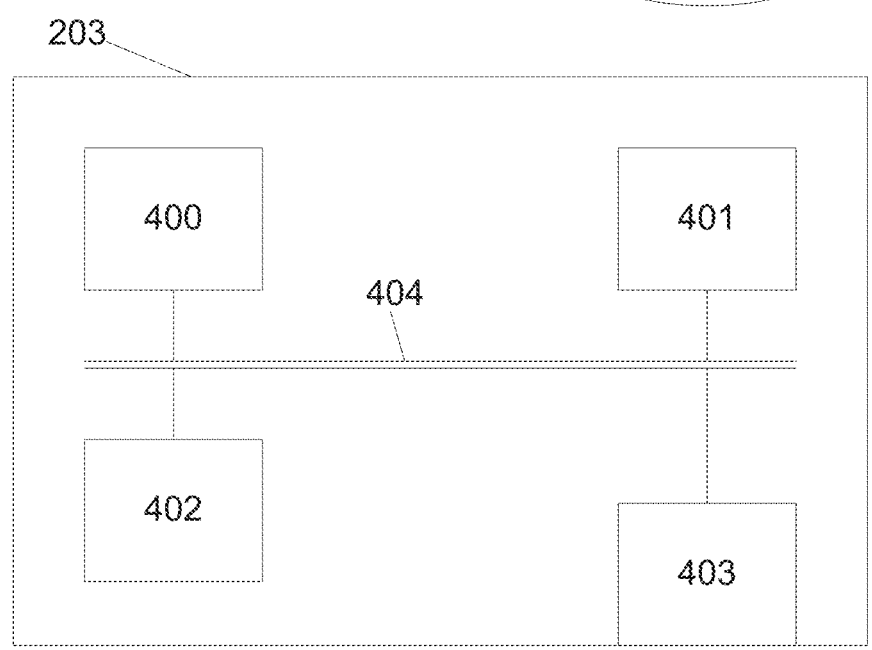
FIG. 4 is a schematic diagram of an example of a computer system of FIG. 2.

As shown in FIG. 4, in one example, the computer system 203 includes at least one microprocessor 400, a memory 401, an input/output device 402, such as a keyboard and/or display, and an external interface 403, interconnected via a bus 404 as shown. In this example the external interface 403 can be utilised for connecting the computer system 203 to peripheral devices, such as the communications networks 202, 204, databases 211, other storage devices, or the like. Although a single external interface 403 is shown, this is for the purpose of example only, and in practice multiple interfaces using various methods (eg. Ethernet, serial, USB, wireless or the like) may be provided.

In use, the microprocessor 400 executes instructions in the form of applications software stored in the memory 401 to allow communication with the base station 201, for example to allow images to be supplied thereto and allow details of the searching process to be displayed to the user.

Accordingly, it will be appreciated that the computer systems 203 may be formed from any suitable processing system, such as a suitably programmed PC, Internet terminal, lap-top, hand-held PC, smart phone, PDA, web server, or the like. Thus, in one example, the processing system 210 is a standard processing system such as a 32-bit or 64-bit Intel Architecture based processing system, which executes software applications stored on non-volatile (e.g., hard disk) storage, although this is not essential. However, it will also be understood that the computer systems 203 can be any electronic processing device such as a microprocessor, microchip processor, logic gate configuration, firmware optionally associated with implementing logic such as an FPGA (Field Programmable Gate Array), or any other electronic device, system or arrangement.

Examples of the searching process will now be described in further detail. For the purpose of these examples, it is assumed that the processing system 210 hosts webpages allowing the user to submit a sample image and view search results. The processing system 210 is therefore typically a server which communicates with the computer system 203 via a communications network, or the like, depending on the particular network infrastructure available. To achieve this the processing system 210 of the base station 201 typically executes applications software for hosting webpages and performing searching, as well as indexing of reference images, with actions performed by the processing system 210 being performed by the processor 300 in accordance with instructions stored as applications software in the memory 301 and/or input commands received from a user via the I/O device 302, or commands received from the computer system 203.

It will also be assumed that the user interacts with the processing system 210 via a GUI (Graphical User Interface), or the like presented on the computer system 203, and in one particular example via a browser application that displays webpages hosted by the base station 201. However, alternatively this can be achieved using an API that interfaces with an existing client application. Actions performed by the computer system 203 are performed by the processor 401 in accordance with instructions stored as applications software in the memory 402 and/or input commands received from a user via the I/O device 403.

However, it will be appreciated that the above described configuration assumed for the purpose of the following examples is not essential, and numerous other configurations may be used. It will also be appreciated that the partitioning of functionality between the computer systems 203, and the base station 201 may vary, depending on the particular implementation.

Figure 5A:
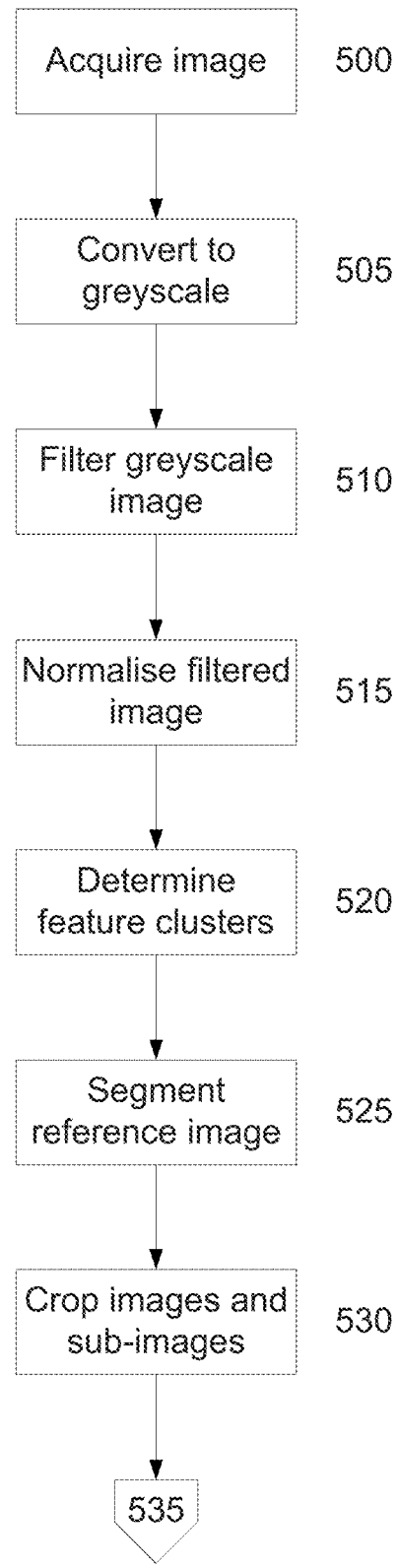
FIGS. 5A and 5B are a flow chart of a further example of a method of processing an image.
Figure 5B:
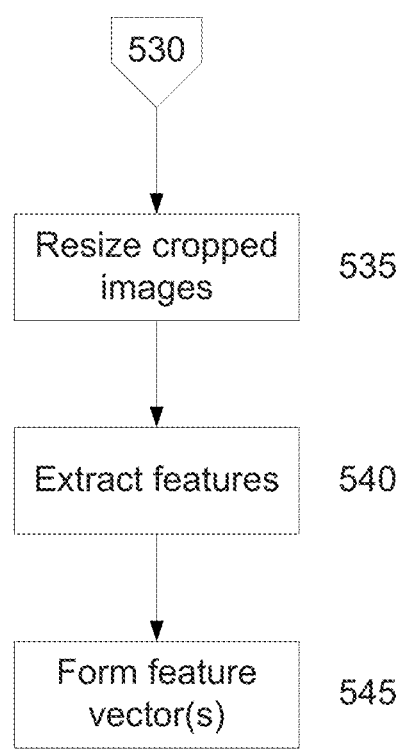

An example of the method of processing an image will now be described in more detail with reference to FIGS. 5A and 5B.

In this example, at step 500 an image is acquired. In the case of a reference image, this is typically obtained from an existing reference image database, for example as part of an indexing procedure described in more detail below with reference to FIG. 6. In the case of sample image, this may be submitted via a user, via a suitable user interface such as a webpage or the like, as shown for example in FIG. 10 and as described in more detail below.

At step 505 the acquired image is converted to a greyscale image and then filtered at step 510, for example using a Gaussian filter to smooth out edges within the image. Prior to performing this step, background colour can be removed from the image using binary thresholding. At step 515 the image can be normalized by applying a local maximal filter so that pixels having a highest intensity are set to a maximal value, whilst pixels of a lowest intensity are set to a minimal value. Additionally, further processing such as filling holes of a mask, smoothing or the like may also be performed, as will be discussed in specific examples below.

At step 520 clusters of features are determined. The manner in which this is performed will depend on the nature of the features. For example, if the image includes text, this could be identified utilizing optical character recognition (OCR) techniques, with the letters representing a particular cluster, whereas for logos, continuous elements of the image could represent a respective cluster.

At step 525, bounding boxes are drawn around the different feature clusters in order to segment the reference image into a number of sub-images. At this stage, the sub-images and image could be presented to a user, allowing the user to modifying the bounding boxes and hence the segmentation. This allows an optional manual check of the image segmentation to be performed, which can be useful in circumstances where different parts of images are difficult to identify through purely automated techniques.

The image and sub-images are then cropped at step 530 to remove any extraneous background. This is typically performed by identifying a background colour and then progressively removing lines of pixels until a non-background portion of the image is reached.

Accordingly, at this stage, a number of cropped images corresponding to the original reference images and sub-images of individual clusters of features are prepared. These are then resized to standard size at step 535, so that standard image sizes can be compared directly.

At step 540 features are extracted from the cropped images with these being used to form one or more feature vectors. Typically a feature vector is obtained for each cropped image and hence a number of feature vectors will be determined for each reference and sample image. The feature vectors are typically indicative of features, such as the intensity of pixels at particular locations, and the manner in which these are generated will be appreciated by persons skilled in the art. This will not therefore be described in further detail.

In any event, by processing both the sample and reference images utilising a common technique, this ensures that the feature vectors of sample and reference images are equivalent allowing for a direct comparison of the feature vectors to be performed without requiring additional processing.

Figure 6:
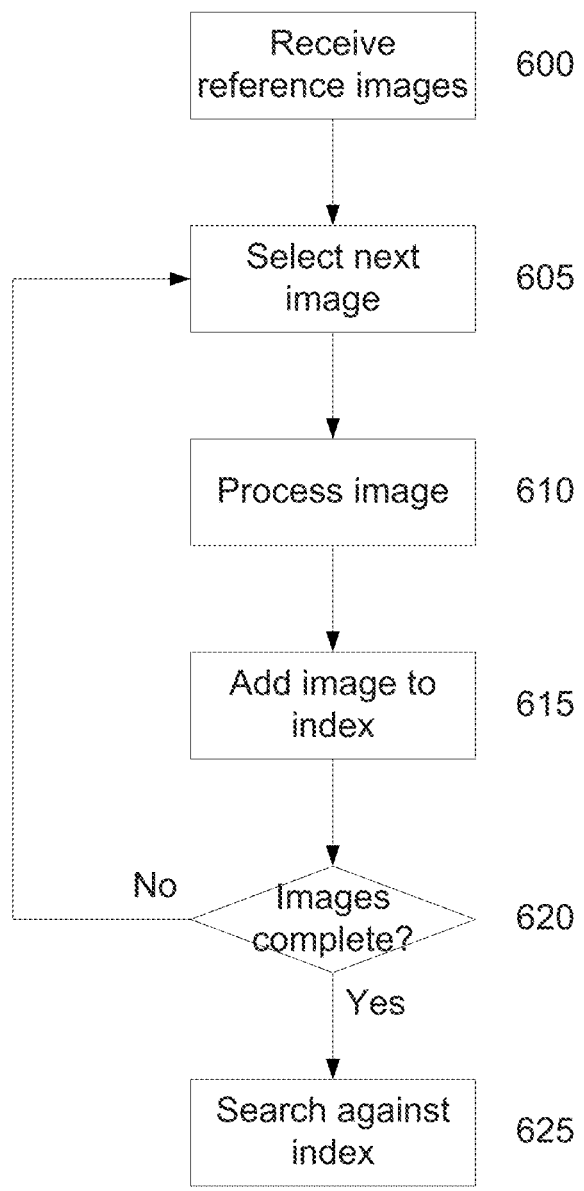
FIG. 6 is a flow chart of an example of a method of creating a search index.

An example of the process for creating an index will now be described in more detail with reference to FIG. 6.

In this example, at step 600 reference images are received. These are typically extracted from a reference database such as a trademark database or the like. At step 605 a next image is selected this being processed at step 610 to determine feature vectors as described above with respect to FIGS. 5A and 5B.

At step 615 the reference image is added to an index of reference images together with details of the sub-images and feature vectors for the image and sub-images. Additionally, any image tags, in the form of metadata tags, associated with the image are also stored as part of the index, although alternatively this can be stored as part of a separate index.

At step 620 it is determined if the images are complete, and if not the process turns to step 605 allowing an image to be selected. Otherwise, at step 625 once the index is complete this can be utilities for performing searching.

Figure 7A:
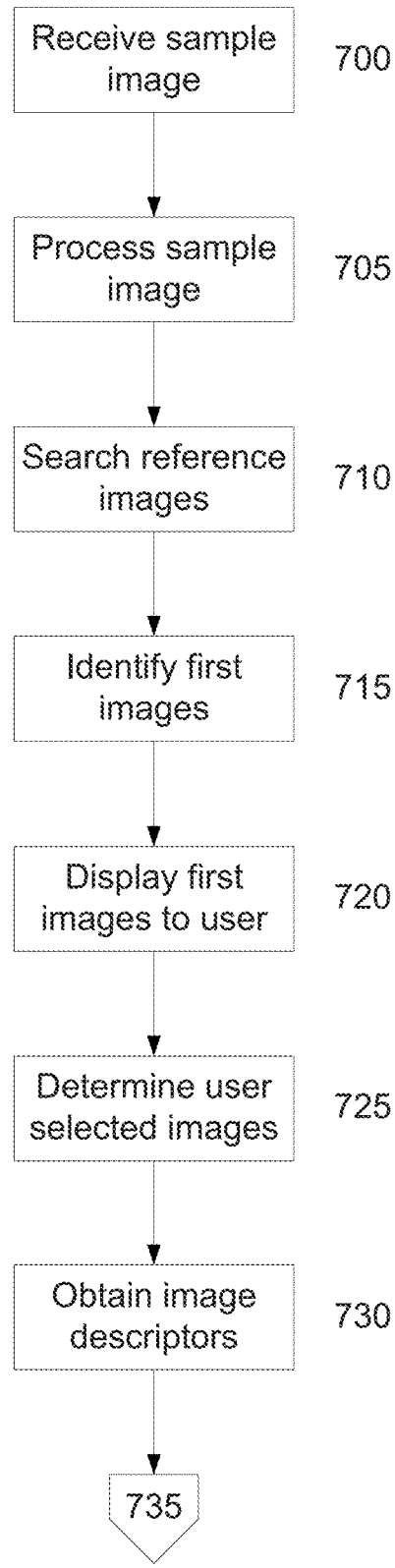
FIGS. 7A and 7B are a flow chart of a further example of a method of searching a plurality of reference images.
Figure 7B:
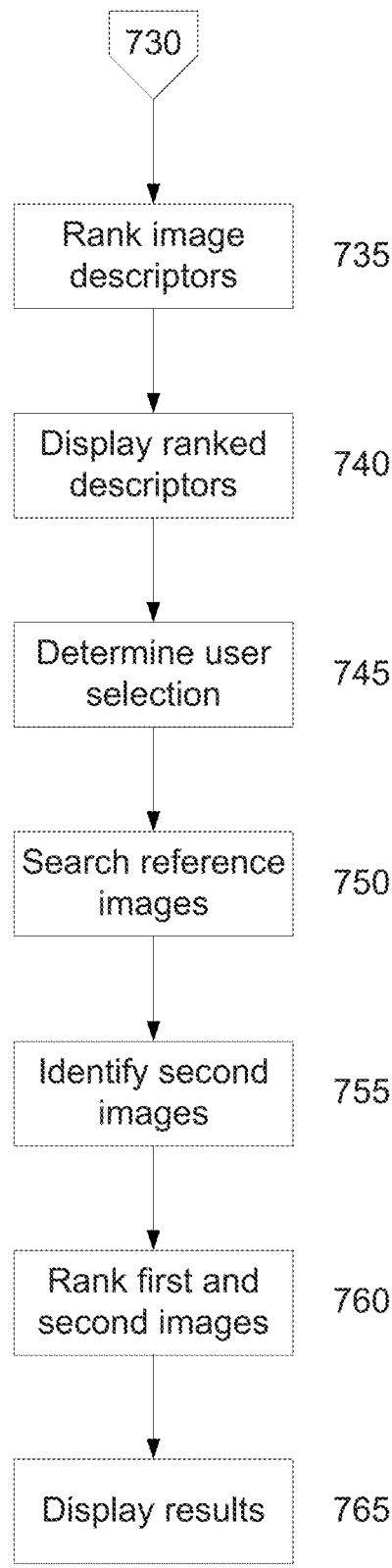

An example process for performing a search will now be described in more detail with reference to FIGS. 7A and 7B.

Figure 10:
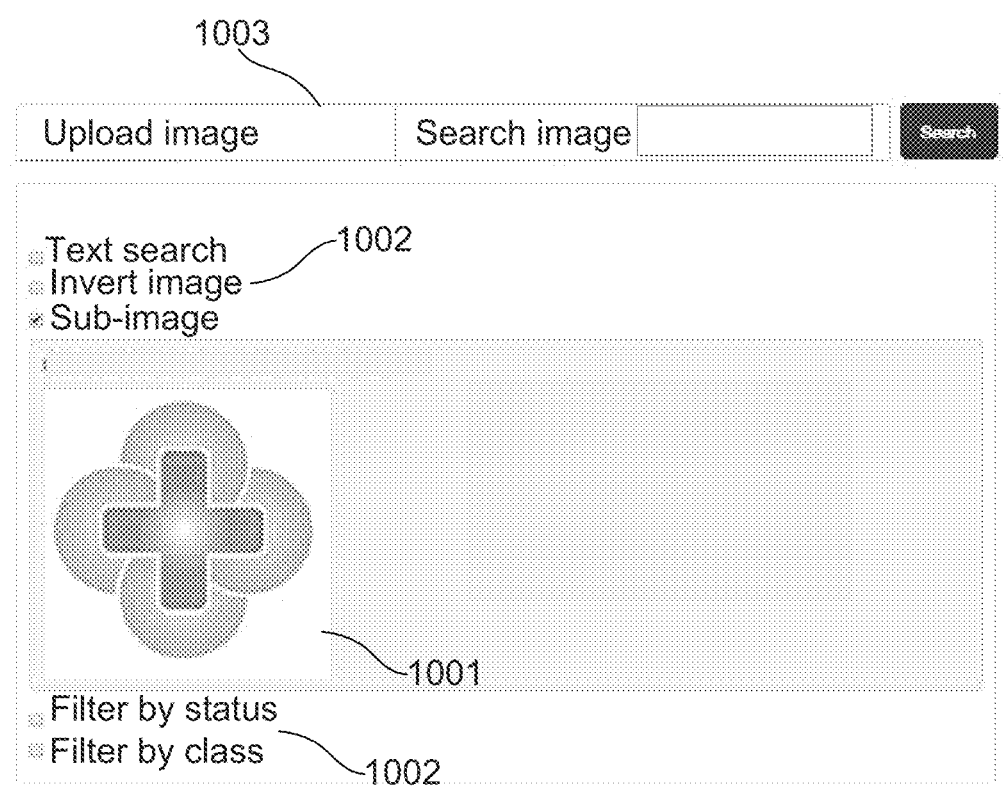
FIG. 10 is a schematic diagram of a user interface used in a searching process.

In this example, a sample image is received by the processing system 210, for example using an interface such as a webpage presented via a browser on the user's computer system 203. An example interface is shown in FIG. 10 which includes a sample image 1001 and a number of options 1002, which can be selected to control the search process. Options typically include text search, image colour inversion, sub-image segmentation, filtering by status (eg: to search reference images corresponding to trademarks have a particular status) or class or dataset (such as different country TMs, web images, app store images, online retail images, or the like). Each option typically enables additional options to be controlled, with segmentation of a sub-image being shown to allow the segmentation to be adjusted. Controls 1003 allow for images to be uploaded and searched.

At step 705 the sample image is processed utilizing the processing technique described above with respect to FIGS. 5A and 5B to thereby determine a plurality of feature vectors. The feature vectors are then searched against the reference images contained against the index at step 710. Accordingly, this involves performing a comparison of sample image feature vectors to reference image feature vectors to identify first reference images that are similar to the sample image at step 715.

Figure 11:
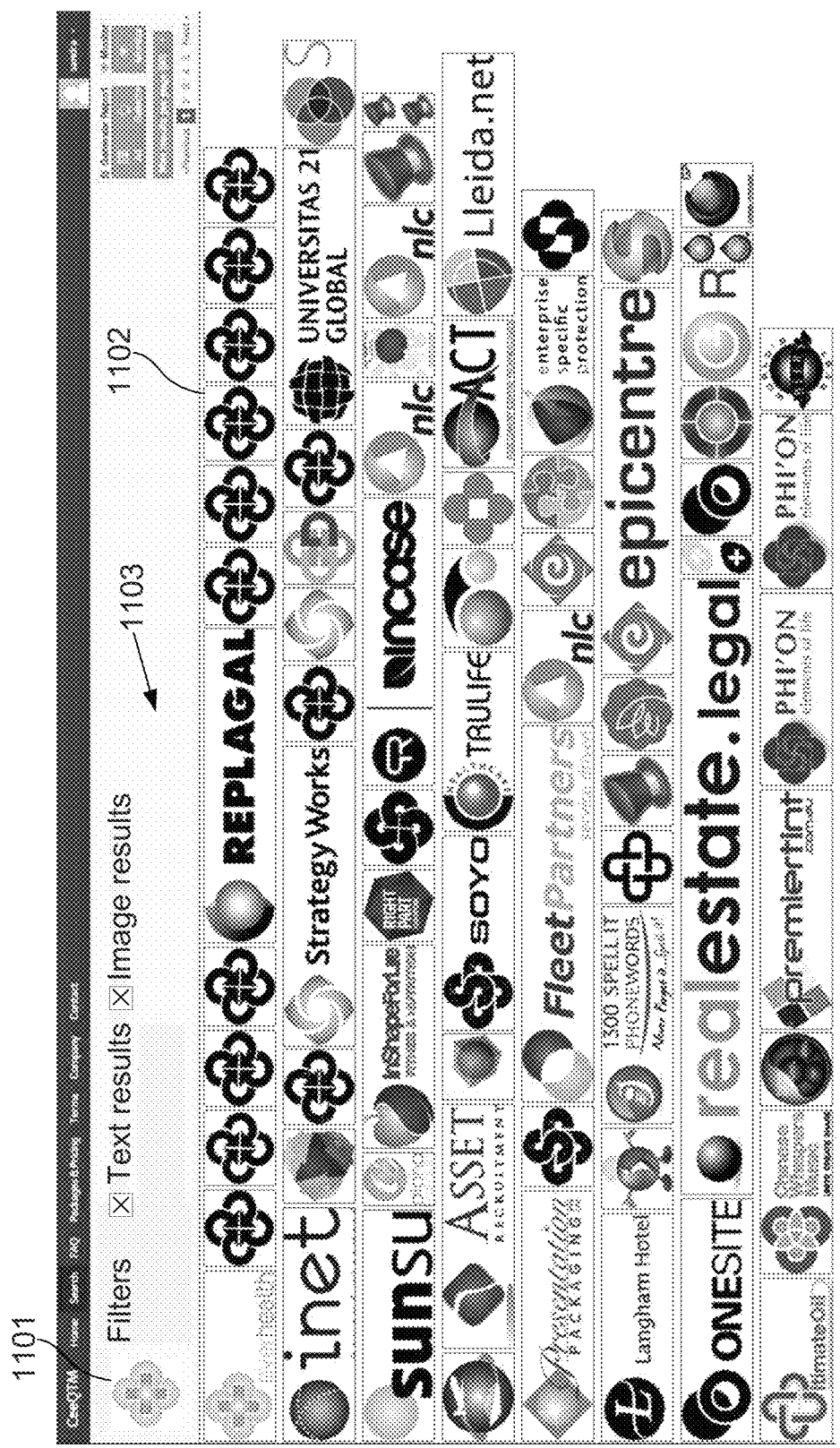
FIG. 11 is a schematic diagram of a user interface displaying a number of search results.

At step 720 first images are displayed to a user via a suitable user interface, such as a webpage presented via a browser on the user's computer system 203. An example of such an interface is shown in FIG. 11. As shown, this displays the sample image 1101, and a number of first reference images 1102. Search options 1103 can also be provided, such as filters to filter results, for example by class, or to show text or image search results. This allows the user to review the sample first reference images and then select ones of these deemed to be relevant as shown for example in FIG. 12.

At step 730, the processing system 210 obtains image tags associated with the selected first reference images and then ranks these at step 735. In this regard, it will be appreciated that each of the selected reference images will have one or more image tags and that common image tags may be used across a number of the images. Accordingly, a frequency analysis can be performed to determine the relative frequency of the currents of each of the image tags allowing these to be ranked.

Figure 13:
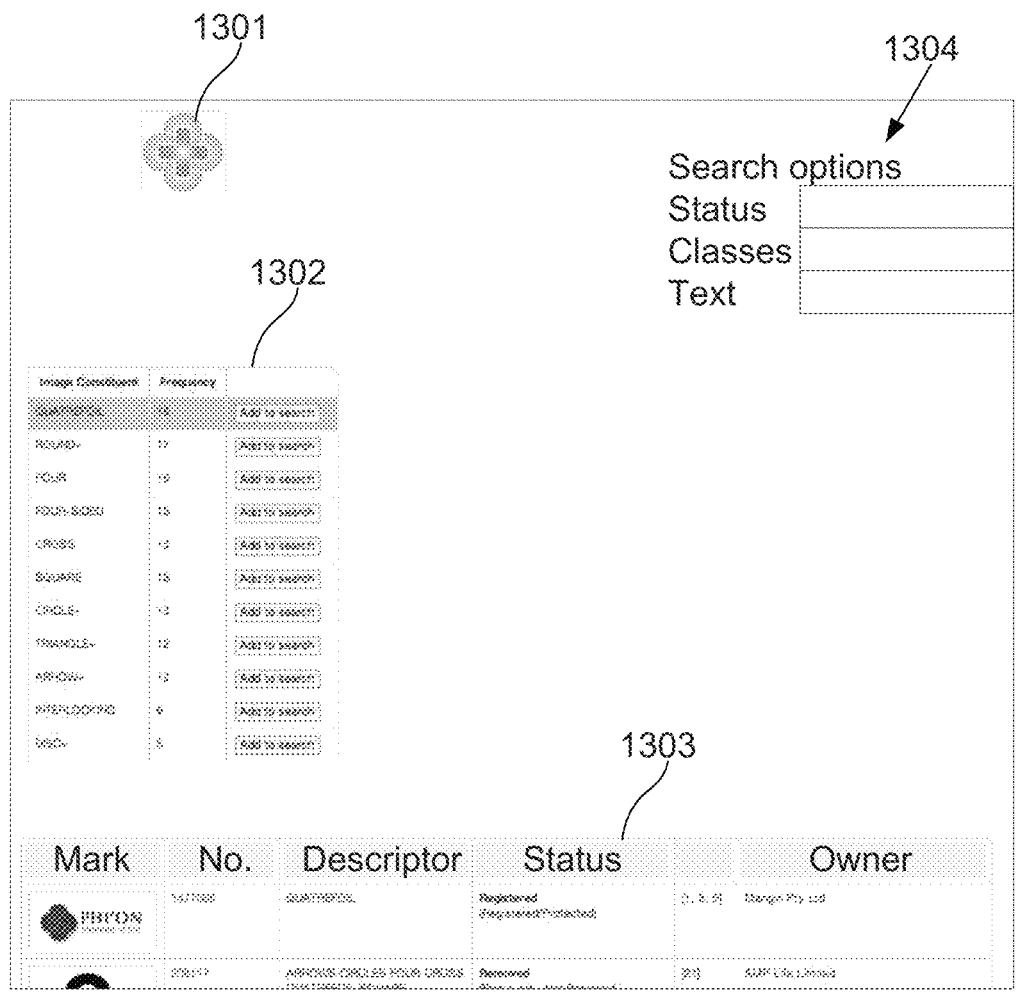
FIG. 13 is a schematic diagram of an example of a user interface displaying identified image tags.

At step 740 the ranked image tags are displayed to the user via an interface, as shown in for example in FIG. 13. In this example, the interface includes the sample image 1301, a list of image tags 1302 and a list of the selected images 1303. Search options 1304, with drop down fields can also be presented allowing results to be filtered, with status, class and text fields being shown for the purpose of example only.

This allows the user to select those image tags that appear most appropriate to the sample image with these then being used to perform a further search of the reference images at step 750.

Once relevant second images have been identified at step 755 the first and second images can be ranked for example based on a degree of similarity, image tags in common or the like. In this regard, it will be appreciated that for reference images that fall within both the first and second image groupings will typically be prioritized. The results can then be displayed to the user at step 765, as shown for example in FIG. 14.

Accordingly, the above described process allows searching to be performed on the basis of a sample image and descriptors associated with reference images.

A specific example of an iterative search combining image recognition and metadata will now be described.

This example, describes a system and method of searching for images in one or more databases in an iterative manner such that visually similar images can be identified using computer based image recognition algorithms, the text-based metadata describing the most relevant resultant images can be identified, and then a combined image and text search can be conducted in order to improve the relevance of search results.

Figure 8:
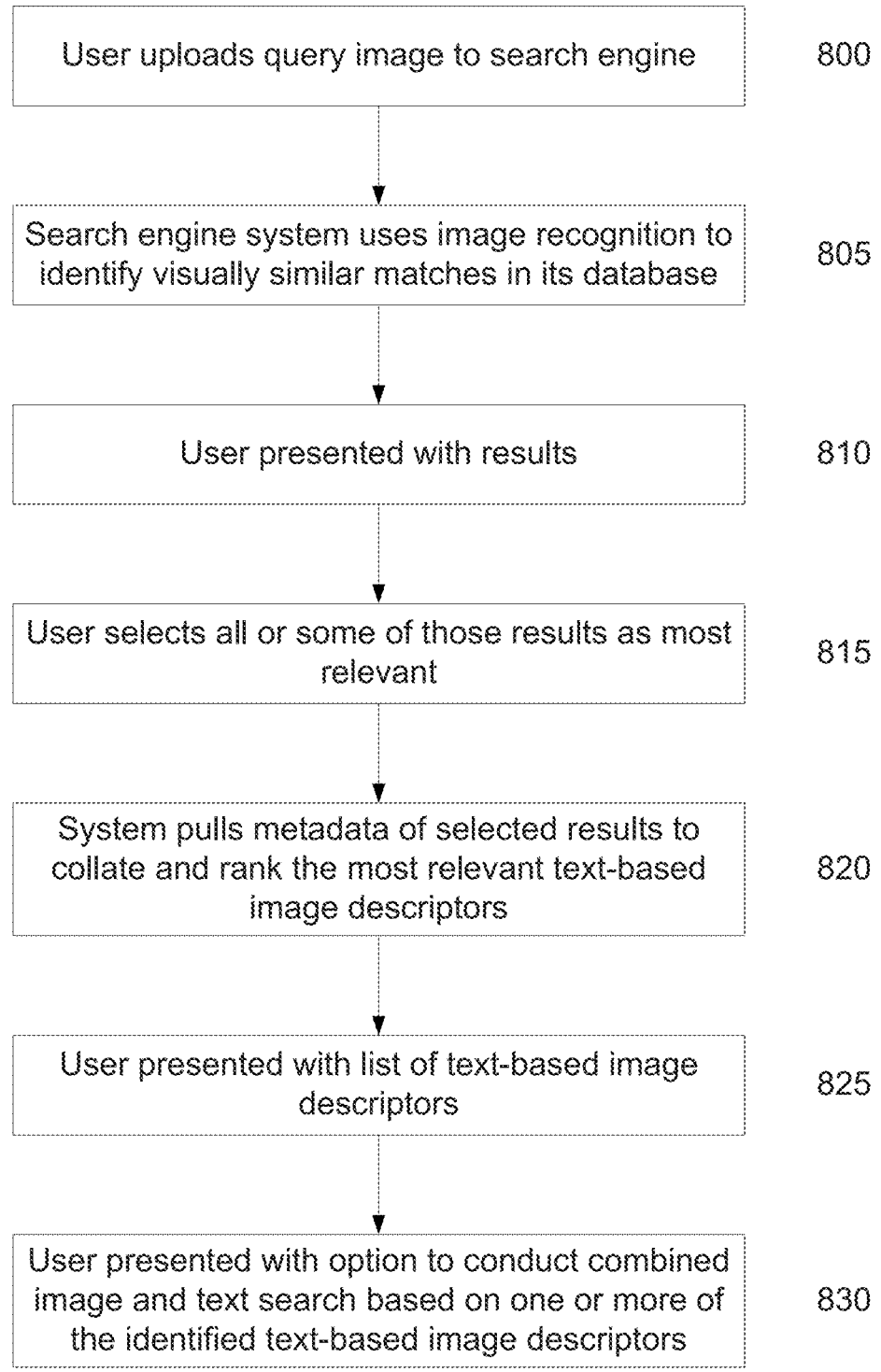
FIG. 8 is a flow chart of a further example of a method for searching images.
Figure 12:
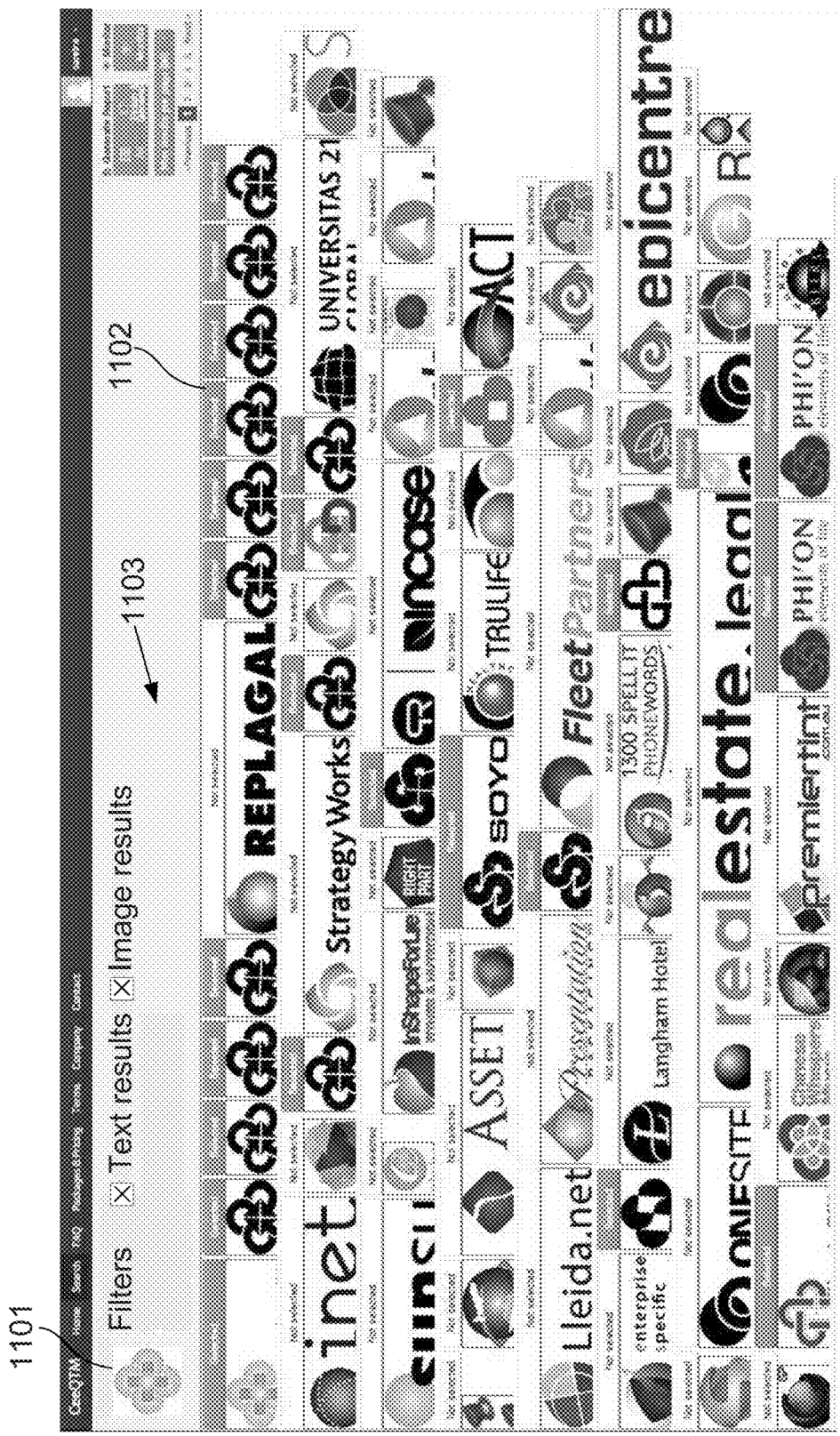
FIG. 12 is a schematic diagram of an example of a user interface displaying selection of a number of results.
Figure 14:
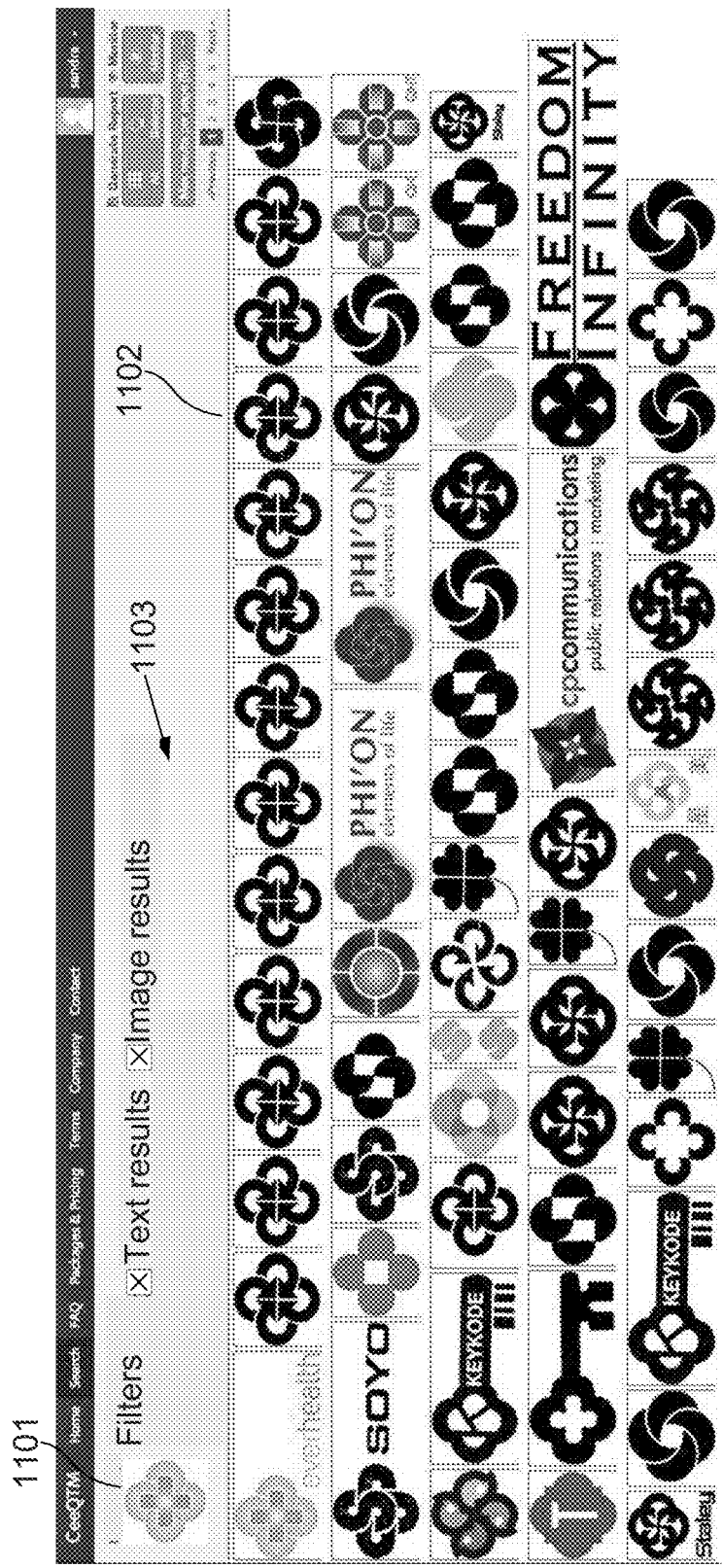
FIG. 14 is a schematic diagram of an example of a user interface displaying a number of search results.

One example of the proposed system as outlined in FIG. 8 comprises the steps of a user-initiated image search 800 whereby an query image is uploaded to the search system using the interface shown in FIG. 10. The system performs image recognition 805 to identify the images in the database most similar to the query image, the user is presented with those results at 810 as shown in FIG. 11, and can select via the user interface all or some of those results he/she finds most relevant at 815 as shown in FIG. 12. The system then pulls text-based image tags from the metadata of those results selected at 820 to collate and rank a list of most relevant descriptors for those results and present it back to the user at 825 as shown in FIG. 13. The user can then combine those text-based image tags to his/her search image to start a new search with combined text and image at 830, as shown in FIG. 14.

Figure 9:
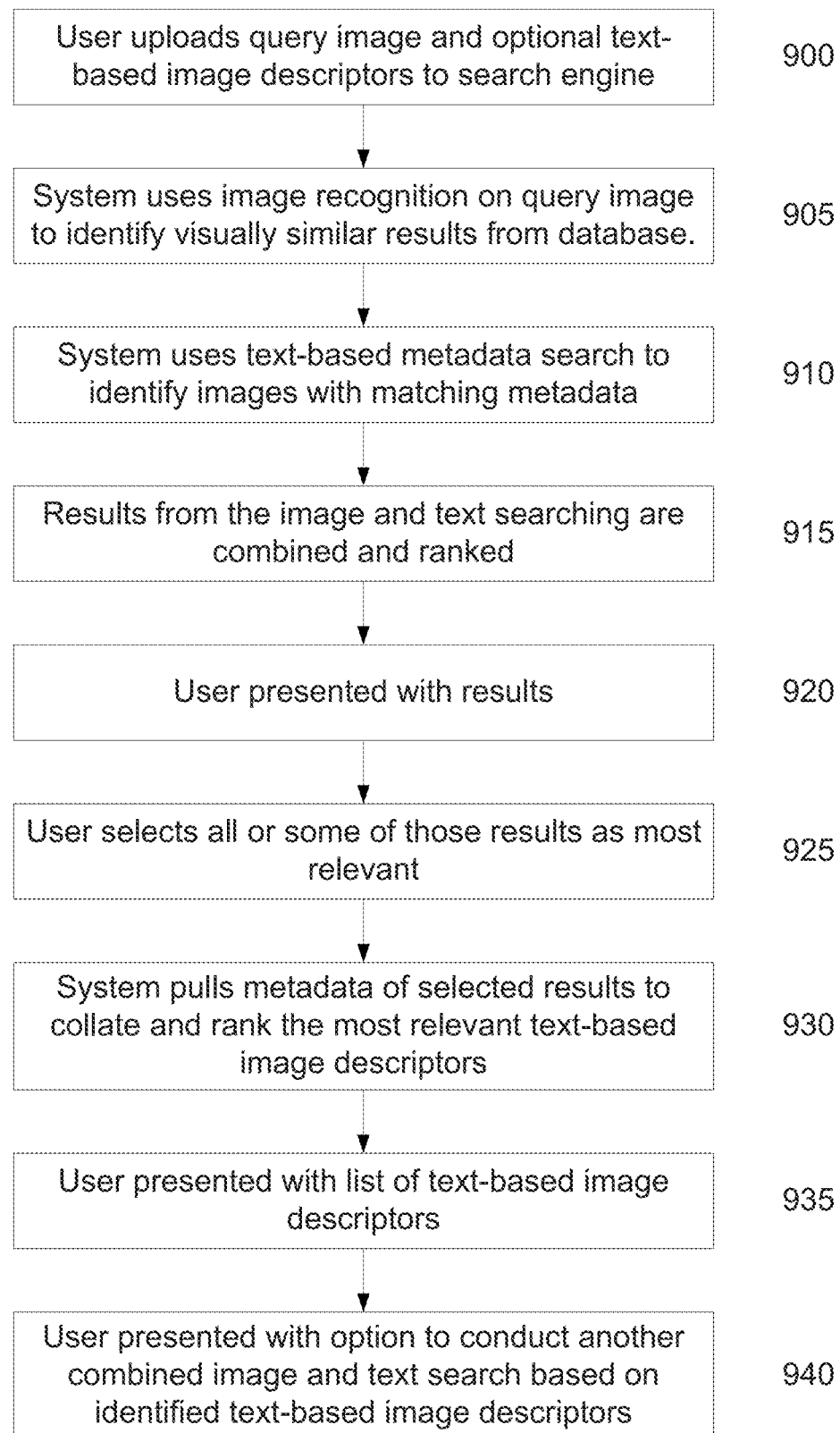
FIG. 9 is a flow chart of a further example of a method for searching images.

The combined image and text search is then conducted in the steps as outlined in FIG. 9 using a similar process whereby the query image and query text (text-based image tag) is provided to the search system at 900. At 905 the search system performs the image recognition search as before via its image recognition subsystem and it additionally also conducts a text search against the database of image metadata (via its metadata text search subsystem) at 910. Resulting images front both subsystem searches are combined at 915 and presented back to the user at 920 as shown in FIG. 14. The rest of the system is the same as described previously in FIG. 8. The user can iteratively conduct and refine searches with additional metadata via this process at 925 to 940.

It is readily apparent that FIG. 9 is the generalized form of FIG. 8, whereby a user can start off with a query that uses both image and text combined.

For such a system, the components required include: image recognition search subsystem, metadata text search subsystem, method of combining and ranking the image results from each search subsystem, and method of combining and ranking the text-based image tags from the selected results. Examples of these components are detailed below.

There are many potential image recognition algorithms possible for the image recognition search subsystem whereby a query image gets compared to a database of known images. A number of image recognition algorithms are reviewed in by Zhao, Chellappa and Phillips in "Face recognition: A literature survey" (2003). One possible approach for the image recognition technique is based on a bag-of-words method. The bag-of-words method is derived from natural language processing where the order of the words is ignored in the analysis of documents. In computer vision, the bag-of-words method inspired a similar idea for image representation where the exact order of location of the extracted image features are not preserved.

According to one example, the present system utilizes a probabilistic multi-region histogram approach for image recognition. An exemplary probabilistic multi-region histogram technique is described by Sanderson, et al. (Sanderson et al., "Multi-Region Probabilistic Histograms for Robust and Scalable Identity Interference", International Conference on Biometrics, Lecture Notes in Computer Science, Vol. 5558, pp. 198-208, 2009) (hereinafter "Sanderson"). The probabilistic multi-region histogram approach proposes that an image is divided into several large regions. According to one example, a closely cropped image is divided into a 3×3 grid resulting in nine regions roughly corresponding to regions of eyes, forehead, nose, cheeks, mouth and jaw regions. Within each region, image features are extracted from smaller patches. Sanderson proposes a method for extracting discrete-cosine transform (DCT) features from 8×8 pixel patches and normalizing the coefficients, keeping only the lower frequency coefficients (the first 16) and discarding the first constant coefficient (resulting in 15 remaining coefficients).

During training, a visual dictionary is built using a mixture of Gaussian's approach to cluster the extracted DCT features and generate likelihood models of visual word as expressed by each Gaussian cluster's principal Gaussian and associated probability distribution function. During evaluation, each extracted DCT feature is compared to the visual dictionary to calculate the posterior probability of the feature vector for every visual word in the visual dictionary. This results in a probabilistic histogram vector with a dimension equivalent to the number of Gaussians in the visual dictionary. The present system generates a probabilistic histogram for each patch and averages them over each image region. The image feature signature is the concatenation of these regional histograms and is the image feature representative of an object image in an image. Two images may be compared to determine whether they represent the same object by comparing the two image feature signatures using a distance/similarity metric. Sanderson proposes a method for calculating the L1-norm between the two signatures. The lower the distance, the more likely the two images are representative of the same object.

For the metadata text search subsystem, there are many open-source and commercially available systems for text search. Well known open-source systems include Lucene, SOLR and ElasticSearch amongst others. Lucene for instance traverses the metadata in the database for every term present in the query and puts matching documents in a heap of size K to compute and return the top-K document matches (in this case, each document is the metadata associated with each image in the database, so in essence returning the top-K images based on metadata match).

Both image and text search subsystems typically return a score to indicate how relevant a match is to the query relative to the other results.

For combining and ranking the image recognition results with the text-search results, different approaches can be used. Assuming that the database searched is the same or overlapping across both image and text search subsystems, one approach for combining the search results is to see if the matches meet different criteria and have an order of preference for each criteria. One example is to prioritize co-occurring results (i.e. results that were found by both the image and text search subsystems). For the rest of the results that do not co-occur, they can be combined in a number of ways based on the search score for each result. For instance by sorting by score for each set then interleaving the results in rank order. Alternatively, the system can try to normalize the scores across the different search subsystems (for instance, if linear, scaling it between 0 to 1), or converting the score to a probability based on a known distribution as described in Mau 2012, "Gaussian Probabilistic Confidence Score for Biometric Applications". If a threshold is applied to the image and text results based on the scores or probabilities of the returned images, the above approaches can still be used (sorting, interleaving, normalizing). An even easier approach is just to display one set of results after or beside the other.

In the proposed system, after the user selects image results that he/she deems are the most relevant, as shown in FIG. 12, the system uses the text-based image tag metadata from those results to make suggestions on text-based image tags to add to the search query, as shown in FIG. 13, thereby enhancing the results shown in FIG. 14.

The collation and ranking of the list of text-based image constituents presented to the user in FIG. 13 can simply be a ranked occurrence frequency in the resultant images' metadata. The ranking of the text-based image constituents can also be weighted by a measure of uniqueness (or discriminability) of a particular constituent. For instance, the words "CIRCLE" and "FOUR" are much more common descriptors than the word "QUATREFOIL", so QUATREFOIL will potentially better narrow the search results. One such weighting for constituents in the metadata can be: total number of results with that constituent/total results in the database.

Typically in trademark databases, these text-based image constituents or descriptors are provided by the trademark office as metadata. It is clear that such a system can easily extend to image databases in general, not just trademarks.

For other databases, text-based image descriptions can be obtained through various means including by image processing techniques such as object recognition, optical character recognition, colour and shape filters, by hand labelled information or image tags, by EXIF data, or metadata tags surrounding the image (for instance in an HTML tag).

Additionally, text-based image tags can be single word, words, phrases, color, or location (including coordinates).

A variant example of the system is an automated version of this iterative search system whereby a user is not required. For such a system, rather than having a user select the most relevant search results, the system would automatically use the top search results (for instance, by using the top N results, or by thresholding the search result scores as described earlier). From those top results, the ranked list of most relevant text-based image tags are generated. The system can then choose the top K most frequent text-based image tags (or apply a threshold for frequency) and add those text-based image tags to do a subsequent image+text query. For such an automated system, the iterative searching can stop based on some pre-defined rule, for instance when the number of overlapping matches between image and text searches stops increasing in a sub-sequent search.

Such a system can also included a pre-processing step of segmenting relevant sub-components in the original query image to do multiple sequences of queries each beginning with a sub-component image.

Another variant example would be to allow for the iterative search to add either the text-based image tag or the selected result image itself (i.e. a search with multiple images+multiple text as the query). This can easily be done by combining multiple single image searches, or using an image set matching approach (Harandi et al. 2011, "Graph embedding discriminant analysis on Grassmannian manifolds for improved image set matching").

Image processing techniques such as object recognition, optical character recognition, colour and shape filters can also be applied both to the image database as it is indexed as well as the query image for more text-descriptors thus text-based metadata searching. Additionally, it can be useful for image pre-processing for segmentation, for instance, segmenting the text area of the image away from a logo part of an image.

A specific example of trademark device matching using image processing will now be described.

The present example provides broadly a system and method of processing images from one or more databases, for instance trademark devices databases, such that visually similar images can be identified and ranged using computer based image recognition algorithms.

Trademark databases present another challenge in that the rules for the format of the images have varied over the years. Also, the rules are few enough such that there are many variations in how the devices are provided in the file. For instance, many of the older trademark devices were scans from paper filings where there are administrative framing, borders and text in the margins which are not part of the device. Additionally, many images in the trademark database contain multiple devices in a single image file. Another compounding problem is that many trademark devices contain both a logo and a written name. While the name is considered part of the device, searchers often consider the degree of similar of the logo component alone as well.

All this means that a system that allows visually similar image searching requires significant pre-processing of the images to isolate the relevant components for comparison based on rules of similarity as defined for trademark confusion (rather than arbitrary judgment). Since there are many (typically millions of) registered trademarks, this pre-processing must be substantially automated.

One example of the proposed system comprises the steps of automated pre-processing of images from trademark database(s) via segmentation of sub-images within the image, then scaling image and sub-image to a pre-determined size, then each resulting image and sub-images goes through a feature extraction step whereby patterns in the image are summarized as "features", and then these images, sub-images, and features are indexed in the databases for searching.

Another example of the proposed system comprises the steps of automated pre-processing of images from trademark database(s) via segmentation of sub-images within the image, then a manual step of human review of those sub-images, then scaling image and sub-image to a pre-determined size, then each resulting image and sub-images goes through a feature extraction step whereby patterns in the image are summarized as "features", and then these images, sub-images, and features are indexed in the databases for searching.

The step of pre-processing the images from trademark database(s) via segmentation of sub-images can take various forms.

One particular example involves saving the original image, and segmenting sub-images from the original image.

Another is saving the original image, then segmenting text-parts of the images, then with the text parts of the image masked segment sub-images from the original image.

Another is the above where all the images and sub-images are trimmed first.

The step of trimming can be done by determining or estimating the background pixel colour (for instance, by assuming the top left corner of the image is the background colour or by averaging top 4 corners or border of the image) or by just assuming that the background should be white or a shade of white (i.e. with intensity value higher than 240 out of 255 where 255 is pure white). Then chopping off the from all 4 edges of image inward until one or more pixels are met that are not background pixel coloured as defined above. The image is then cropped to that resulting bounding box to return a trimmed image.

However alternatively techniques could be used, such as iteratively increasing the threshold on a grayscale image until the number of pixels on either side of the threshold stops changing. The background colour is then selected as the side that has the large number of pixels as the background colour, with this then being removed using a mask of those pixels.

Examples of how to detect and segment the text-parts of the image can be based on variants of the Constrained Run-Length Algorithm as originally proposed in Wahl, Wong, and Casey ("Block segmentation and text extraction in mixed text/image documents". Computer Graphics Image Processing, 1982). Another approach is variants of the Stroke Width Transform (SWT) algorithm as proposed by Epshtein, Ofek, and Wexler ("Detecting text in natural scenes with stroke width transform", Computer Vision and Pattern Recognition, 2010).

When the text is detected, that section is cropped and saved as a sub-object. Then that area is masked in the original image, for instance, by creating a new image based on the original the text area filled with the image background colour, typically white. In one example, text detection is performed in accordance with a whitelist of expected text terms. For example, metadata associated with an image typically includes an indication of any text contained within the image and accordingly, this can be used to establish a whitelist, which can then be compared to results of the OCR process to facilitate accurate detection of the text.

One example of how to segment distinct sub-images (i.e. multiple devices within one image file, or components of a device in an image file) within the original image or the text-removed image involves first converting the image to grayscale, then using a combination of theses steps: a Gaussian filter to smooth out the edges (helps tie together nearby adjacent shapes), apply a local maximum filter whereby all pixels of maximal value in their neighborhood are set to max (or white), fill in the holes of the mask, smooth the edges by performing binary opening and closing operations on that mask, then threshold the mask to get clusters, and derive the bounding boxes of those clusters. The boxes can be ranked or filtered based on size requirements, and finally trimmed and saved as sub-images. However, it will be appreciated that other techniques could be used.

Once the image and sub-images (both text and images) have been cropped, trimmed and scaled, features can be extracted.

Different features can be applied to different types of images. For instance, text-cropped images may be treated different in order to do optical character recognition (OCR). Whereas "image-only" images may use different features.

One possible approach for the image recognition technique is based on a bag-of-words method. The bag-of-words method is derived from natural language processing where the order of the words is ignored in the analysis of documents. In computer vision, the bag-of-words method inspired a similar idea for image representation where the exact order of location of the extracted image features are not preserved.

According to one example, the present system utilizes a probabilistic multi-region histogram approach for image recognition. An exemplary probabilistic multi-region histogram technique is described by Sanderson, et al. (Sanderson et al., "Multi-Region Probabilistic Histograms for Robust and Scalable Identity Interference", International Conference on Biometrics, Lecture Notes in Computer Science, Vol. 5558, pp. 198-208, 2009) (hereinafter "Sanderson"). The probabilistic multi-region histogram approach proposes that an image is divided into several large regions. According to one example, a closely cropped image is divided into a 3×3 grid resulting in nine regions roughly corresponding to regions of eyes, forehead, nose, cheeks, mouth and jaw regions. Within each region, image features are extracted from smaller patches. Sanderson proposes a method for extracting discrete-cosine transform (DCT) features from 8×8 pixel patches and normalizing the coefficients, keeping only the lower frequency coefficients (the first 16) and discarding the first constant coefficient (resulting in 15 remaining coefficients).

During training, a visual dictionary is built using a mixture of Gaussian's approach to cluster the extracted DCT features and generate likelihood models of visual word as expressed by each Gaussian cluster's principal Gaussian and associated probability distribution function. During evaluation, each extracted DCT feature is compared to the visual dictionary to calculate the posterior probability of the feature vector for every visual word in the visual dictionary. This results in a probabilistic histogram vector with a dimension equivalent to the number of Gaussians in the visual dictionary. The present system generates a probabilistic histogram for each patch and averages them over each image region. The image feature signature is the concatenation of these regional histograms and is the image feature representative of an object image in an image. Two images may be compared to determine whether they represent the same object by comparing the two image feature signatures using a distance/similarity metric. Sanderson proposes a method for calculating the L1-norm between the two signatures. The lower the distance, the more likely the two images are representative of the same object.

According to one example, the present system performs automatic object detection to detect objects (e.g., a logo, a product, and a brand) in an image. Object matching typically involves the detection and extraction of distinct features in an image. To perform reliable object recognition, it is important that the features extracted from the image are detectable under changes in image scale, noise, illumination and perspective change. The present system detects points that typically lie on high-contrast regions of the image, such as object edges.

According to one example, the present system utilizes a scale-invariant feature transform (SIFT) keypoint detection technique that includes calculating maxima and minima of the result of difference of Gaussians function applied in a scale space to a series of progressively smoothed/blurred versions of the image. The present system assigns a dominant orientation to each keypoint, and analyses the gradient magnitudes and orientation to determine a feature vector. The feature vector can then be translated to a feature histogram in an approach similar to the Multi-Region Histogram approach as described via comparing each feature vector extracted from an image to a visual dictionary of features, and storing the resulting probabilistic histogram. The present system further matches features between images by comparing those features across images using a nearest-neighbor search to find a certain percentage of matches higher than an acceptable threshold.

Figure 15:
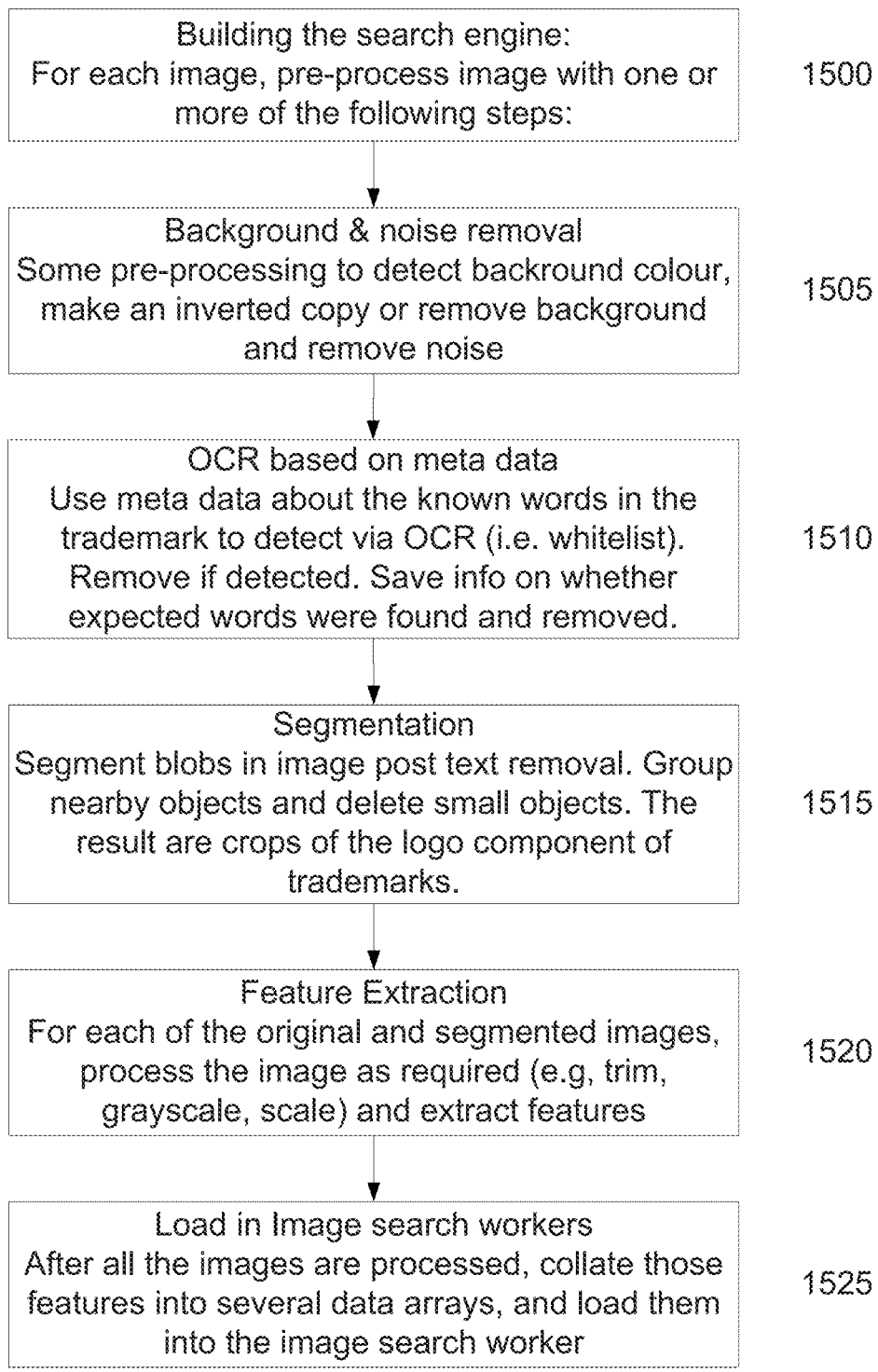
FIG. 15 is a flow chart of a further example of a method for creating a search index.

Thus, an overall process could be as shown in FIG. 15. This broadly includes the steps of building a search engine 1500, which for each image, involves pre-processing the image with one or more of the following steps. At step 1505 background & noise removal is performed which involves some pre-processing to detect background colour, make an inverted copy or remove background and remove noise. At step 1510 OCR based on meta data is performed, using meta data about known words in the trademark to detect via OCR (i.e. whitelist). These words are then removed if detected, with information being saved on whether expected words were found and removed.

At 1515 segmentation is performed, which involves segmenting blobs in image post text removal. Nearby objects are grouped and small objects deleted with the results being crops of the logo component of trademarks. At 1520 feature extraction is performed for each of the original and segmented images, with the image being processed as required (e.g, trim, grayscale, scale) and features extracted as described above. At 1530 after all the images are processed, features are collated into several data arrays, and loaded into the image search worker.

Figure 16:
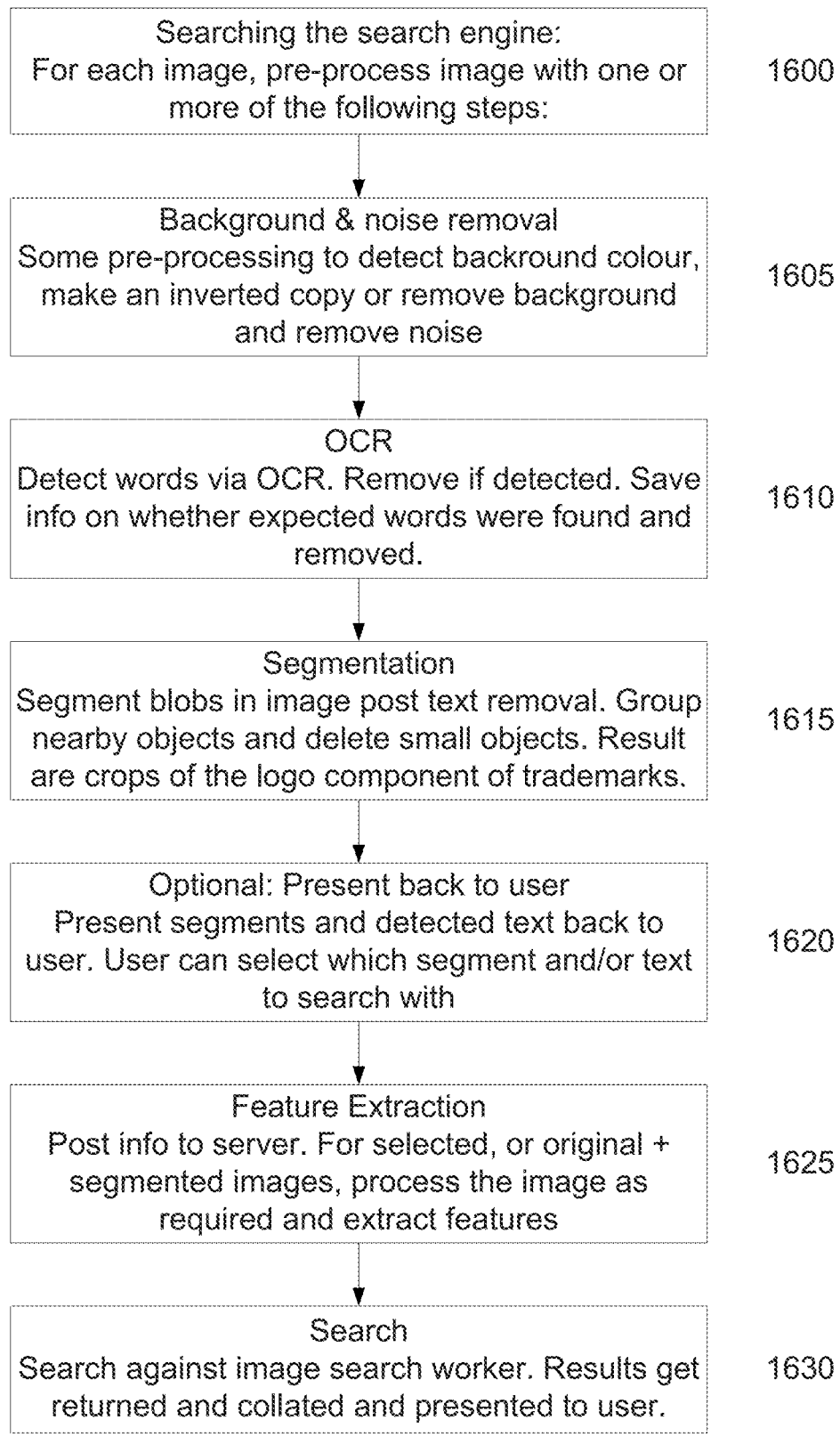
FIG. 16 is a flow chart of a further example of a method for performing a search; and, FIG. 17 is a schematic block diagram of an example of a search process.

As shown in FIG. 16, a similar set of steps are performed when searching. Thus, in this case, for each sample image, the image is pre-processed at 1600 with one or more of the following steps.

At 1605 background & noise removal is performed involving some pre-processing to detect background colour, make an inverted copy or remove background and remove noise. At 1610 OCR is performed to detect words, which are removed if detected, with information being saved on whether expected words were found and removed.

At 1615 segmentation is performed to segment blobs in the image post text removal. Grouping of nearby objects and deletion of small objects is performed with the result being crops of the logo component of trademarks. At this stage the processed image can optionally be presented to the user at 1620 allowing the user to approve, modify or create segments.

At 1625 feature extraction is performed, with the image being processed as required, for example by trimming, grayscaling, resizing or the like, before features are extracted.

At 1630, searching is performed against image search worker, with the results being collated and returned to the user.

Figure 17:
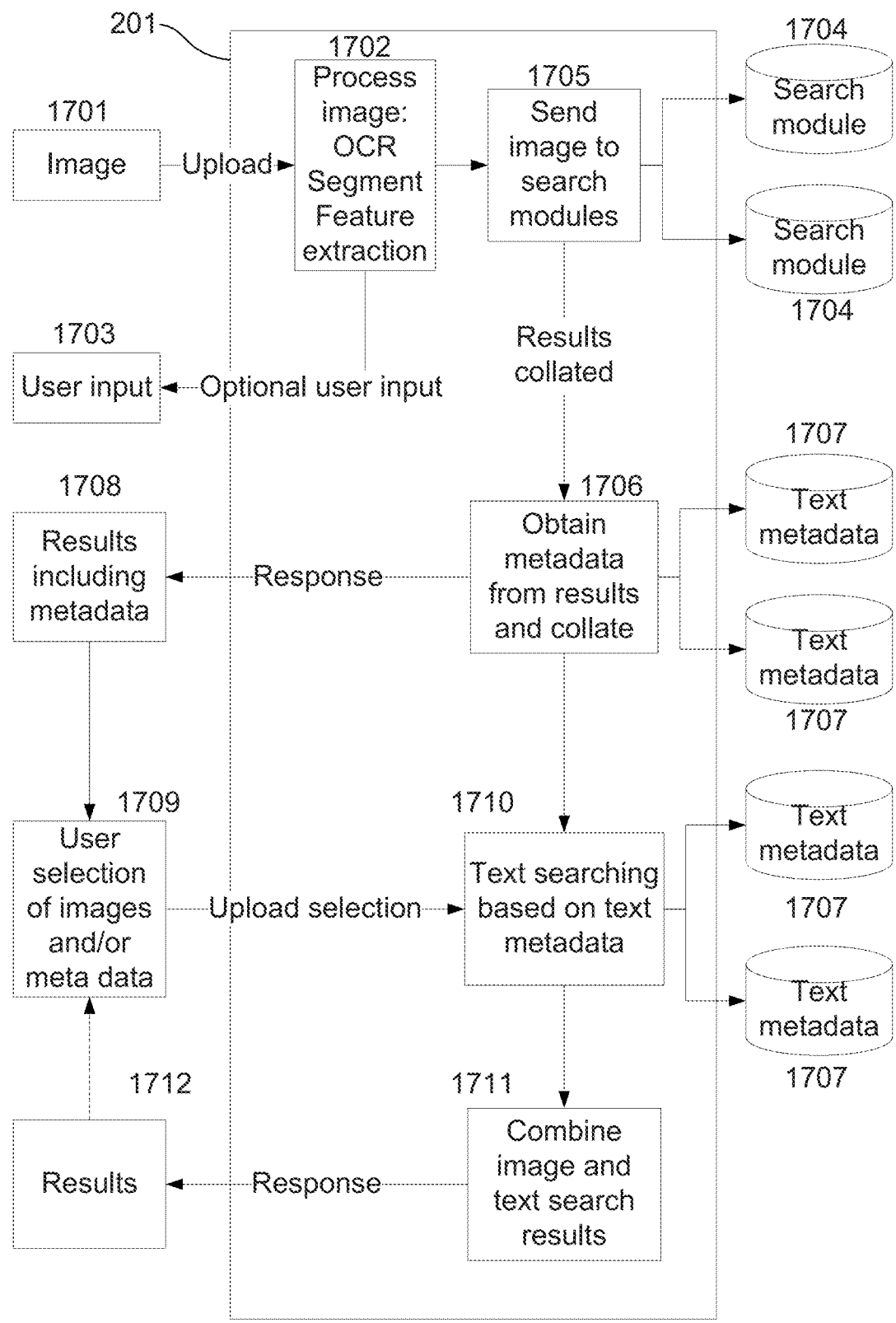

This is process and associated workflow is further shown in FIG. 17.

In this example, the image 1701 is uploaded to the server 210, where it is processed at 1702, for example by performing OCR, segmentation and feature extraction. As part of this process user input 1703 can be sought, for example to guide the segmentation process.

Following processing, the image is forwarded to one or more search modules 1704 at 1705. In this regard, each module can include part of an overall collection of reference images, so that processing of the entire collection can be performed in parallel by multiple modules as will be appreciated by persons skilled in the art.

Results are then collated, with metadata in the form of image tags being obtained from the text metadata stored in the index 1707 at 1706. Results including the metadata are presented to the user at 1708, with a user selection of relevant images and/or metadata being performed at 1709. The user selection is uploaded, allowing text searching to be performed on the text metadata 1707 at 1710.

The results are combined at 1711 and provided to the user at 1712, allowing the steps 1709 to 1712 to be repeated as required, allowing the results to be further refined.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. An apparatus for performing trademark searching of a plurality of reference trademark images, the apparatus including one or more electronic devices that:
    a) process a sample image including a composite trademark by segmenting the sample image to form a plurality of sample sub-images, each sample sub-image including at least one of: text, a logo, or a logo part;
    b) crop the sample sub-images to form one or more cropped sample sub-images;
    c) generate a sample feature vector for a selected cropped sample sub-image of the one or more cropped sample sub-images;
    d) search the plurality of reference trademark images to identify first reference trademark images visually similar to the selected cropped sample sub-image by comparing the sample feature vector to reference feature vectors that correspond to sub-images of the reference trademark images;
    e) identify image tags associated with at least one of the first reference trademark images;
    f) search the plurality of reference trademark images to identify second reference trademark images using at least one of the image tags;
    g) determine a first image ranking in accordance with a similarity of first reference trademark images with the sample image;
    h) determine a second image ranking in accordance with a similarity of second reference trademark images with the image tags;
    i) determine a results ranking of the first and second reference trademark images, wherein the results ranking is determined in accordance with the first and second image rankings; and
    j) combine the results into a single list including at least some first reference trademark images and at least some second reference trademark images by sorting the first and second reference trademark images using the results ranking.

2. The apparatus according to claim 1, wherein the one or more electronic devices select the at least one first reference trademark image at least partially in accordance with the first image ranking.

3. The apparatus according to claim 1, wherein the one or more electronic devices:
    a) present at least some first reference trademark images to a user;
    b) determine at least one selected first reference trademark image in accordance with user input commands; and
    c) identify image tags associated with the at least one selected first image.

4. The apparatus according to claim 3, wherein the one or more electronic devices present first reference trademark images to the user in accordance with a first image ranking.

5. The apparatus according to claim 1, wherein the one or more electronic devices:
    a) determine an image tag ranking in accordance with a frequency of occurrence; and
    b) select the at least one image tag at least partially in accordance with the image tag ranking.

6. The apparatus according to claim 1, wherein the one or more electronic devices:
    a) present a plurality of image tags associated with the at least one first reference trademark image to the user;
    b) determine at least one selected image tag in accordance with user input commands; and
    c) search the plurality of reference trademark images using the at least one selected image tag.

7. The apparatus according to claim 6, wherein the one or more electronic devices present image tags in accordance with an image tag ranking.

8. The apparatus according to claim 1, wherein the image tags include metadata tags.

9. The apparatus according to claim 1, wherein the one or more electronic devices determine the results ranking in accordance with the combination of first and second image rankings.

10. The apparatus according to claim 1, wherein the one or more electronic devices receive the sample image from the user.

11. The apparatus according to claim 1, wherein the one or more electronic devices segment the sample image by:
   a) determining clusters of image features; and
   b) segmenting the image in accordance with clusters.

12. The apparatus according to claim 11, wherein the one or more electronic devices segment the sample image by:
   a) converting the sample image to a greyscale image;
   b) filtering the grey scale image to generate a filtered grey scale image;
   c) normalising an image intensity of the filtered grey scale image to generate a normalised image; and
   d) determining clusters within the normalised image.

13. The apparatus according to claim 1, wherein the one or more electronic devices process the sample image by at least one of:
   a) scaling the sample image and the sample sub-images;
   b) determining image features from the sample image and sample sub-images; and
   c) remove at least one of:
      i) an image background;
      ii) noise; and
      iii) text.

14. The apparatus according to claim 11, wherein the one or more electronic devices scale the sample image and sample sub-images by:
   a) cropping the images and sub-images to remove background and form cropped images; and
   b) resizing the cropped image to a defined image size.

15. The apparatus according to claim 1, wherein the one or more electronic devices process the sample image by:
   a) performing optical character recognition to detect text; and
   b) removing text from the image.

16. The apparatus according to claim 1, wherein the one or more electronic devices:
   a) process at least one of the sample sub-images to determine sample image features; and
   b) use the sample image features to determine the sample feature vector.

17. A method for performing trademark searching of a plurality of reference trademark images, the method including:
   a) processing a sample image including a composite trademark by segmenting the sample image to form a plurality of sample sub-images, each sample sub-image including at least one of: text, a logo, or a logo par;
   b) cropping the sample sub-images to form one or more cropped sample sub-images;
   c) generating a sample feature vector for a selected cropped sample sub-image of the one or more cropped sample sub-images;
   d) searching the plurality of reference trademark images to identify first reference trademark images visually similar to the selected cropped sample sub-image by comparing the sample feature vector to reference feature vectors that correspond to sub-images of the reference trademark images;
   e) identifying image tags associated with at least one of the first reference trademark images;
   f) searching the plurality of reference trademark images to identify second reference trademark images using at least one of the image tags;
   g) determining a first image ranking in accordance with a similarity of first reference trademark images with the sample image;
   h) determining a second image ranking in accordance with a similarity of second reference trademark images with the image tags;
   i) determining a results ranking of the first and second reference trademark images, wherein the results ranking is determined in accordance with the first and second image rankings; and
   j) combining the results into a single list including at least some first reference trademark images and at least some second reference trademark images by sorting the first and second reference trademark images using the results ranking.

18. An apparatus for use in trademark searching of a plurality of reference trademark images, the apparatus including one or more electronic devices that:
   a) acquire at least one sample image including a composite trademark;
   b) process the sample image by segmenting the sample image to form a plurality of sample sub-images, each sample sub-image including at least one of: text, a logo or a logo part;
   c) crop the sample sub-images to form one or more cropped sample sub-images;
   d) generate a sample feature vector for a selected cropped sample sub-image of the one or more cropped sample sub-images; and
   e) search the plurality of reference trademark images, and wherein trademark searching is performed at least in part by:
      i) searching the plurality of reference trademark images to identify first reference trademark images visually similar to the selected cropped sample sub-image by comparing the sample feature vector to reference feature vectors that correspond to sub-images of the reference trademark images;
      ii) identifying image tags associated with at least one of the first reference trademark images;
      iii) searching the plurality of reference trademark images to identify second reference trademark images using at least one of the image tags;
      iv) determining a first image ranking in accordance with a similarity of the first reference trademark images with the sample image;
      v) determining a second image ranking in accordance with a similarity of the second reference trademark images with the image tags;
      vi) determining a results ranking of the first and second reference trademark images, wherein the results ranking is determined in accordance with the first and second image rankings; and
      vii) combining the results into a single list including at least some first reference trademark images and at least some second reference trademark images by sorting the first and second reference trademark images using the results ranking.

19. The apparatus according to claim 18, wherein the method includes creating an index including the plurality of reference trademark images, each reference trademark image being associated with a plurality of sub-images and reference feature vectors that correspond to each of the plurality of sub-images.

20. The apparatus according to claim 18, wherein the one or more electronic devices segment the sample image by:
   a) determining feature clusters in the sample image; and
   b) segmenting the sample image in accordance with the clusters.

21. The apparatus according to claim 18, wherein the one or more electronic devices segment the sample image by:
   a) converting the sample image to a greyscale image;
   b) filtering the grey scale image to generate a filtered grey scale image;
   c) normalising an image intensity of the filtered grey scale image to generate a normalised image; and
   d) determining clusters within the normalised image.

22. The apparatus according to claim 18, wherein the one or more electronic devices process the sample image by at least one of:
   a) scaling the sample image and the sample sub-images;
   b) determining image features from the sample image and sample sub-images; and
   c) remove at least one of:
      i) an image background;
      ii) noise; and
      iii) text.

23. The apparatus according to claim 22, wherein the one or more electronic devices scale the sample images by:
   a) cropping the images and sample sub-images to remove background and form cropped images; and
   b) resizing the cropped image to a defined image size.

24. The apparatus according to claim 18, wherein the one or more electronic devices process the sample image by:
   a) performing optical character recognition to detect text; and
   b) removing text from the sample image.

25. The apparatus according to any claim 24, wherein when the image is a reference trademark image, the one or more electronic devices associate the text with the reference trademark image in an index.

26. The apparatus according to claim 18, wherein the one or more electronic devices:
   a) process at least one of the sample sub-images to determine image features; and
   b) use the image features to determine the sample feature vector.

27. A method for use in trademark searching of a plurality of reference trademark images, the method including:
   a) acquiring at least one sample image including a composite trademark;
   b) processing the sample image by segmenting the sample image to form a plurality of sample sub-images, each sample sub-image including at least one of: text, a logo, or a logo part;
   c) cropping the sample sub-images to form one or more cropped sample sub-images;
   d) generating a sample feature vector for a selected cropped sample sub-image of the one or more cropped sample sub-images; and
   e) searching, the plurality of reference trademark images, at least in part by:
      i) searching the plurality of reference trademark images to identify reference trademark images visually similar to the selected cropped sample sub-image by comparing the sample feature vector to reference feature vectors that correspond to sub-images of the reference trademark images;
      ii) identifying image tags associated with at least one of the first reference trademark images;
      iii) searching the plurality of reference trademark images to identify second reference trademark images using at least one of the image tags;
      iv) determining a first image ranking in accordance with a similarity of the first reference trademark images with the sample image;
      v) determining a second image ranking in accordance with a similarity of the second reference trademark images with the image tags;
      vi) determining a results ranking of the first and second reference trademark images, wherein the results ranking is determined in accordance with the first and second image rankings; and
      vii) combining the results into a single list including at least some first reference trademark images and at least some second reference trademark images by sorting the first and second reference trademark images using the results ranking.

28. An apparatus for performing searching of a plurality of reference trademark images, the apparatus including one or more electronic devices that:
   a) process a sample image including a composite trademark by segmenting the sample image to form a plurality of sample sub-images, each sample sub-image including at least one of: text, a logo, or a logo part;
   b) crop the sample sub-images to form one or more cropped sample sub-images;
   c) generate a sample feature vector for a selected cropped sample sub-image of the one or more cropped sample sub-images;
   d) search the plurality of reference trademark images to identify first reference trademark images visually similar to the selected cropped sample sub-image by comparing the sample feature vector to reference feature vectors that correspond to sub-images of the reference trademark images;
   e) identify image tags associated with at least one of the first reference trademark images;
   f) search the plurality of reference trademark images to identify second reference trademark images using at least one of the image tags;
   g) determine a first image ranking in accordance with a similarity of first reference trademark images with the sample image;
   h) determine a second image ranking in accordance with a similarity of second reference trademark images with the image tags;
   i) determine a results ranking of the first and second reference trademark images, wherein the results ranking is determined in accordance with the first and second image rankings; and
   j) combine the results into a single list including at least some first reference trademark images and at least some second reference trademark images by sorting the first and second reference trademark images using the results ranking.

* * * * *